(12) United States Patent
Zhang et al.

(10) Patent No.: US 8,988,274 B2
(45) Date of Patent: Mar. 24, 2015

(54) CYLINDRICAL POLARIMETRIC PHASED ARRAY RADAR

(75) Inventors: Guifu Zhang, Norman, OK (US);
Robert D. Palmer, Norman, OK (US);
Dusan S. Zmic, Norman, OK (US);
Richard J. Doviak, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 69 days.

(21) Appl. No.: 12/947,523

(22) Filed: Nov. 16, 2010

(65) Prior Publication Data
US 2011/0285582 A1 Nov. 24, 2011

Related U.S. Application Data

(60) Provisional application No. 61/261,695, filed on Nov. 16, 2009.

(51) Int. Cl.
| | | |
|---|---|---|
| *G01S 13/95* | (2006.01) | |
| *H01Q 21/20* | (2006.01) | |
| *H01Q 3/26* | (2006.01) | |
| *G01S 7/02* | (2006.01) | |
| *G01S 13/02* | (2006.01) | |

(52) U.S. Cl.
CPC .............. *H01Q 21/205* (2013.01); *G01S 7/024* (2013.01); *G01S 13/95* (2013.01); *G01S 2013/0272* (2013.01); *H01Q 3/26* (2013.01)
USPC ............. 342/26 R; 342/81; 342/175; 342/368

(58) Field of Classification Search
CPC ................ G01S 13/48; G01S 13/4463; G01S 2013/0245
USPC .......................................................... 342/26
See application file for complete search history.

(56) References Cited

U.S. PATENT DOCUMENTS

| | | | |
|---|---|---|---|
| 4,425,567 A * | 1/1984 | Tresselt ........................ | 342/373 |
| 4,647,933 A * | 3/1987 | Hogg .......................... | 342/26 D |
| 4,823,136 A | 4/1989 | Nathanson et al. | |
| 5,027,123 A * | 6/1991 | Haykin et al. ................ | 342/188 |
| 5,276,452 A | 1/1994 | Schuss et al. | |
| 5,544,525 A * | 8/1996 | Peterman et al. .......... | 73/170.13 |
| 6,061,013 A * | 5/2000 | Sauvageot et al. .......... | 342/26 R |
| 6,771,218 B1 * | 8/2004 | Lalezari et al. ............... | 342/373 |
| 7,205,928 B1 * | 4/2007 | Sweet ......................... | 342/26 B |
| 7,522,095 B1 | 4/2009 | Wasiewicz et al. | |
| 8,259,001 B2 * | 9/2012 | Mizutani et al. ................ | 342/96 |
| 8,289,203 B2 | 10/2012 | Culkin et al. | |

(Continued)

*Primary Examiner* — John B Sotomayor
*Assistant Examiner* — Marcus Windrich
(74) *Attorney, Agent, or Firm* — Dunlap Codding P.C.

(57) ABSTRACT

A radar data acquisition system including a polarimetric phased array antenna and a radar control and processing system. The polarimetric phased array antenna includes a support system, an array of panels and a switching network. One or more of the panels include a dual pole antenna for at least one of transmitting and receiving a dual polarization electromagnetic beam. The switching network communicates with the panels such that at least one of power, radar and control signals are sent to and received from one or more selected panels. The radar control and processing system communicates with the switching network for forming electromagnetic signals directed to one or more selected panels such that the selected panels form a dual polarization electromagnetic beam, and for reading signals sensed by one or more selected panels and for decoding the signals into an electronic radar output.

20 Claims, 12 Drawing Sheets

(56) References Cited

U.S. PATENT DOCUMENTS

| | | | |
|---|---|---|---|
| 2006/0092075 A1* | 5/2006 | Bruce et al. | 342/175 |
| 2008/0218424 A1* | 9/2008 | Blanton | 343/756 |
| 2009/0204372 A1* | 8/2009 | Johnston et al. | 702/191 |
| 2010/0141527 A1* | 6/2010 | Lalezari | 342/368 |
| 2010/0311321 A1* | 12/2010 | Norin | 455/3.02 |
| 2012/0133549 A1 | 5/2012 | Culkin et al. | |

* cited by examiner

| CONFIGURATIONS | SIZE, m | SPACING, λ | ROWS (M) | COLUMNS (N) | $N_t$ |
|---|---|---|---|---|---|
|  | 2R = 8.54 | 1.0 | 86 | 268 | 23048 |
| | | 0.75 | 115 | 358 | 41170 |
| | | 0.5 | 172 | 537 | 92364 |
|  | 2R = 9.88 | 1.0 | 86 | 309 | 26574 |
| | | 0.75 | 115 | 414 | 47610 |
| | | 0.5 | 172 | 621 | 106812 |
|  | 2R = 12.1 | 1.0 | 86 | 380 | 32680 |
| | | 0.75 | 115 | 508 | 58420 |
| | | 0.5 | 172 | 760 | 130720 |
|  | 2a = 17.1 | 1.0 | 86 | 3X171=513 | 44118 |
| | | 0.75 | 115 | 3X228=684 | 78660 |
| | | 0.5 | 172 | 3X342=1026 | 176472 |
|  | 2a = 12.1 | 1.0 | 86 | 4X95=380 | 32680 |
| | | 0.75 | 115 | 4X127=508 | 58420 |
| | | 0.5 | 172 | 4X190=760 | 130720 |

CYLINDRICAL POLARIMETRIC PHASED ARRAY RADAR

CROSS-REFERENCE TO RELATED APPLICATIONS

The present patent application claims priority to the United States Provisional patent application identified by U.S. Ser. No. 61/261,695 which was filed on Nov. 16, 2009; the entire contents of which are hereby incorporated herein by reference.

STATEMENT REGARDING FEDERALLY SPONSORED RESEARCH OR DEVELOPMENT

This invention was made with government support under contract number ATM 0608168 awarded by the National Science Foundation; and contract number NA 080AR4320886 awarded by the National Oceanic and Atmospheric Administration. The government has certain rights in the invention.

THE NAMES OF THE PARTIES TO A JOINT RESEARCH AGREEMENT

Not Applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC

Not Applicable.

BACKGROUND

It is becoming widely accepted that radar polarimetry provides accurate and informative weather measurements, while phased array radar (PAR) technology can shorten data update time. This suggests that the future weather radar should have the functions of both polarimetry and electronic steering capabilities, i.e., Polarimetric Phased Array Radar (PPAR), allowing multi-missions of weather surveillance and target detection.

In addition to military applications for target recognition and tracking (Brookner 2007), Phased Array Radar (PAR) technology has recently been successfully introduced to the weather community. A phased array weather radar, the National Weather Radar Testbed (NWRT) operating at a wavelength of 9.38 cm, was developed in Norman, Okla. through a joint effort of a government/university/industry team (Zrnic et al. 2007). The NWRT demonstrated that its pulse-to-pulse electronic beam steering capability enables as accurate meteorological measurements in shorter storm surveillance times as achieved with a conventional dish antenna having a mechanically steered beam. The shorter surveillance times result in faster data updates and the capability to observe detailed evolutions of severe storm phenomena (Yu et al. 2007; Heinselman et al. 2008). The NWRT also has a hybrid capability to both mechanically and electronically steer the beam. This capability has allowed multi-pattern measurements of the same meteorological volume to successfully mitigate both stationary and moving clutter (Zhang et al. 2010). Furthermore, the NWRT uses an antenna from the AN/SPY1-A monopulse radar of the Aegis system (Sherman, 1988), which has sum and difference channels; these can be combined to implement Spaced Antenna Interferometry (SAI) techniques for crossbeam wind measurement (Zhang and Doviak 2007), and subvolume inhomogeneity/object detection (Zhang and Doviak 2008). It has been also theorized that the AN/SPY1-A auxiliary channels could support implementation of adaptive clutter cancellation techniques (Le et al. 2009).

While PAR technology has recently received wide-spread attention in the weather community, weather radar polarimetry has matured to a point that it is being implemented on the national network of WSR-88D Doppler radars (Doviak et al. 2000) using its conventional dish antenna. Polarimetric radar provides multi-parameter measurements that reveal detailed microphysics of storms in addition to hydrometeor classification, accurate precipitation estimation and improved weather nowcasts. Therefore, the weather community and the nation expect that the future Multi-function Phased Array Radar (MPAR) will retain all the capabilities of the polarimetric WSR-88D (Smith et al. 2008). It is the polarimetric capability which the 2nd MPAR symposium (http://www.ofcm.noaa.govimpar-symposium, 17-19 Nov., 2009, Norman, Okla.) identified as the most challenging technical issue that the community is facing. The challenge comes from the fact that highly accurate polarimetric radar measurements are required to provide meaningful information. But biases inherent to Planar Polarimetric Phased Array Radar (PPPAR) exist and can be larger than the intrinsic values if the beam is directed away from the planar array's broadside. For example, the intrinsic ZDR values range only from about 0.1 dB for drizzle and dry snow to 3-4 dB for heavy rain and large drops. Thus, it is desirable that the measurement error for ZDR be of the order of 0.1 dB (Zhang et al. 2001, Brandes et al. 2003). But the ZDR bias for a PPPAR can be a few dBs (Zhang et al. 2009a). Hence, it is crucial for the success of the MPAR project that the system configuration for a PPPAR is selected correctly and designed optimally.

In the presentation at the 34th AMS radar conference, a number of issues with PPAR for weather measurements have been listed and discussed, including sensitivity, bias, calibration, cross-polar isolation, array configuration, polarization mode selection, waveform optimization, and signal processing and display. The polarization bias was quantified and a calibration procedure was proposed by Zhang et al. (2009) for planar arrays. The other issues remain.

As background, a variety of antenna array configurations exist including linear array, planar array, circular/cylindrical array, and spherical array. The linear array needs one mechanical rotation for weather surveillance like the rapid Doppler On Wheels (rapid DOW) (Wurman 2003) and the proposed design for CASA (Hopf et al. 2009). For the planar array, multiple faces (normally four) are needed (e.g., the SPY-1A). But the planar array has sensitivity loss and polarization bias if the beam points away from the broadside (Zhang et al. 2009a). Antennas having circular or cylindrical configurations have been used for direction finding and communications (Royer 1966; Raffaelli and Johansson 2003) but not with a dual-polarization phased-array radar, (multi-function or single function), for weather related tasks. For satellite communication applications, the spherical array is optimal and flexible in its use of the antenna aperture size and in its symmetry (Tomasic et al. 2002).

With respect to PPAR, possible antenna array configurations for PPAR include linear array, 2D planar array, and spherical array. The linear array needs one mechanical rotation for weather surveillance like rapid DOW (Wurman, 2003) and the proposed design for CASA (Hopf et al. 2009). For planar array, multiple faces (normally four) are needed (e.g., the SPY-1A or, as with the NWRT a composite of mechanical and electronic beam steering. The planar array has issues of sensitivity loss and polarization bias when the beam points away from the broadside (Zhang et al. 2009). A spherical array is optimal and flexible in terms of using the antenna aperture and has the symmetry in all the directions (Tomasic et al. 2002) needed for receiving signals from satellites. For weather applications, however, the spherical array can have problems in making polarimetric measurement of weather because high cross-polar isolation is required.

BRIEF DESCRIPTION OF THE SEVERAL VIEWS OF THE DRAWING

Implementations of the invention may be better understood when consideration is given to the following detailed description thereof. Such description makes reference to the annexed pictorial illustrations, schematics, graphs, drawings, and appendices. In the drawings.

DETAILED DESCRIPTION

Numerous applications of the present invention are described, and in the following description, numerous specific details are set forth. However, it is understood that implementations of the invention may be practiced without these specific details. Furthermore, while particularly described with reference to weather radars, aspects of the invention are not so limited. For example, the polarimetric phased array radar disclosed below is applicable to the passive reception of data, the transmission of data and combinations thereof in communications and remote sensing. Further, the polarimetric phased array radar can be used for automatic target detection and recognition in military and civilian applications.

Figure 1:
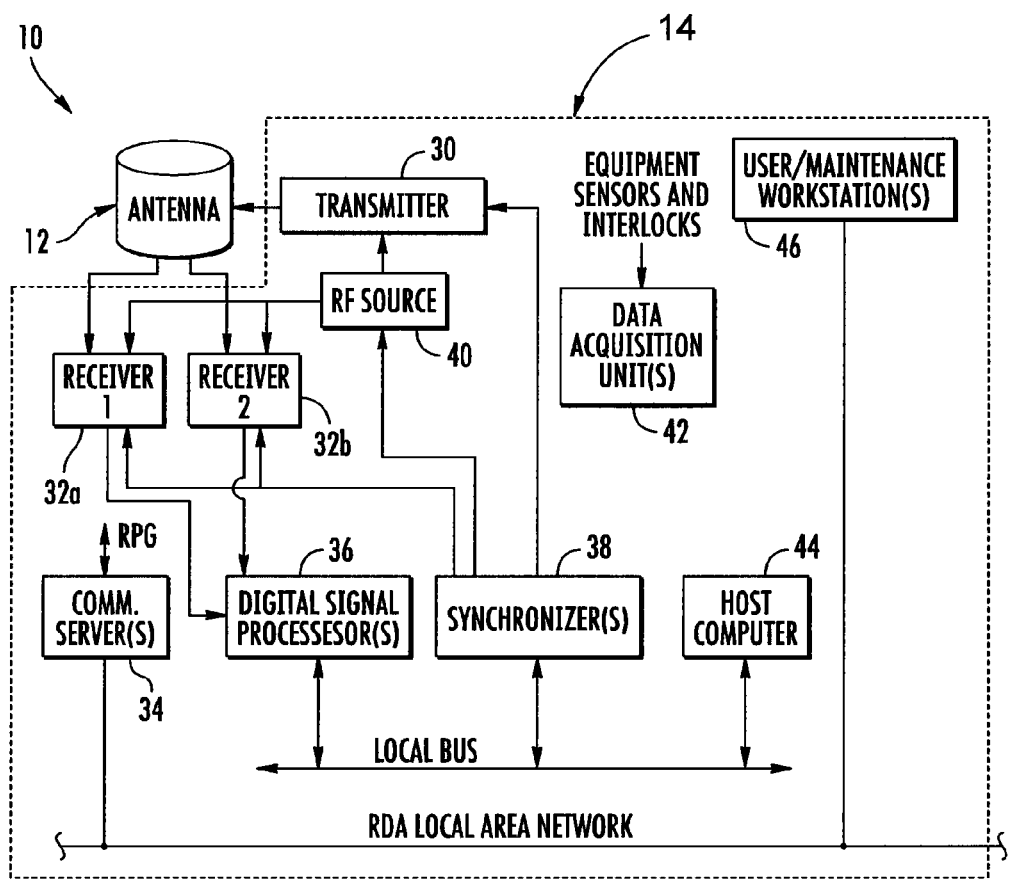
FIG. 1 is a schematic diagram of a radar data acquisition system constructed in accordance with one version of the present invention.

Referring now to the drawings, and in particular to FIG. 1, shown therein and designated by reference numeral 10 is a radar data acquisition system constructed in accordance with the present invention. In general, the radar data acquisition system 10 is provided with a polarimetric phased array antenna 12, and a radar control and processing system 14. The polarimetric phased array antenna 12 can include a cylindrical arrangement for orthogonal dual-polarizations and the same beam-width in all azimuth directions. In general, the polarimetric phased array antenna 12 is provided with a support system 18, an array of panels 20, and a switching network 22. The polarimetric phased array antenna 12 can also optionally be provided with a cover (also known as a radome) 24. Much of the electronic systems can be housed inside the support system 18, if desired.

The support system 18 can be constructed in any suitable manner, such as one or more inflatable device, or one or more interconnected system of brackets, and/or flanges and/or other mechanical supports such as bolts, fasteners, welds, or the like. The support system 18 can either be stationary or mounted to a movable pedestal. The support system 18 can be connected to a ground station, a building, a communication tower, a ship, a ground based vehicle, and/or a manned or unmanned airplane, airborne vehicle or the like.

The array of panels 20 are supported by the support system 18 in a substantially cylindrical configuration. That is, the panels 20 can include a planar configuration, and in one embodiment the panels 20 have a same size, i.e., width and/or height. In one embodiment, the support system 18 supports the panels 20 at a non-zero angle relative to the horizontally adjacent panels 20, and in the same plane as the vertically adjacent panels 20 such that the panels 20 surround the support system 18 to form the substantially cylindrical configuration. The number of panels and/or facets in the polarimetric phased array antenna 12 can be varied depending upon the desired use of the polarimetric phased array antenna 12. Further, while the panels 20 are depicted in a square configuration, it should be understood that the shape of the panels 20 can also be varied. For example, the panels 20 can be provided with any symmetric, asymmetric or other geometries, such as square, rectangular, triangular, circular, or the like. In one aspect, the shape of the panels 20 is chosen such that the panels 20 can be aligned at their edges to form the array.

Figure 2A:
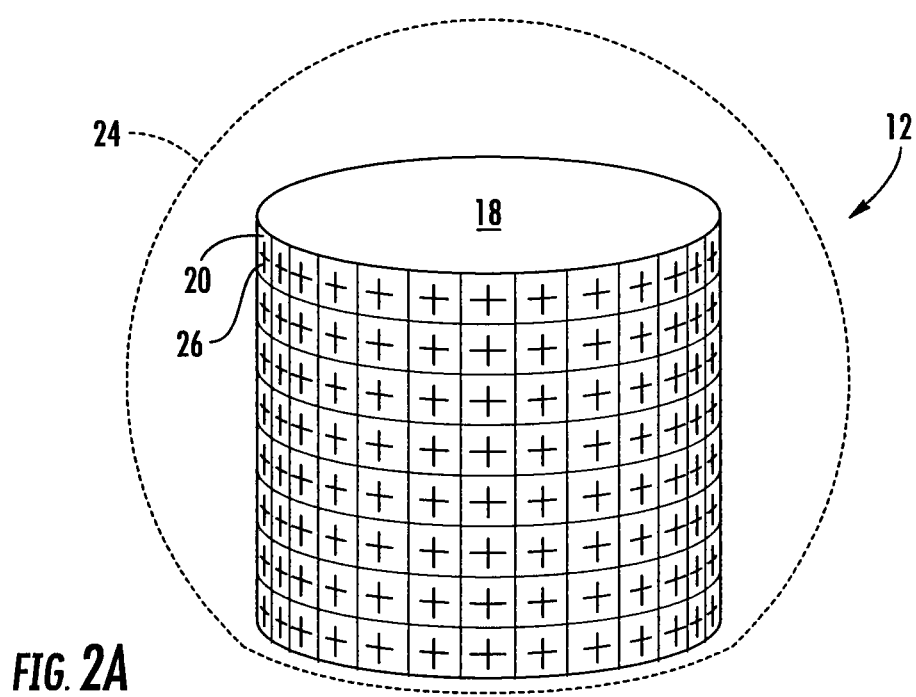
FIG. 2a is a perspective view of a polarimetric phased array antenna constructed in accordance with a version of the present invention.
Figure 2B:
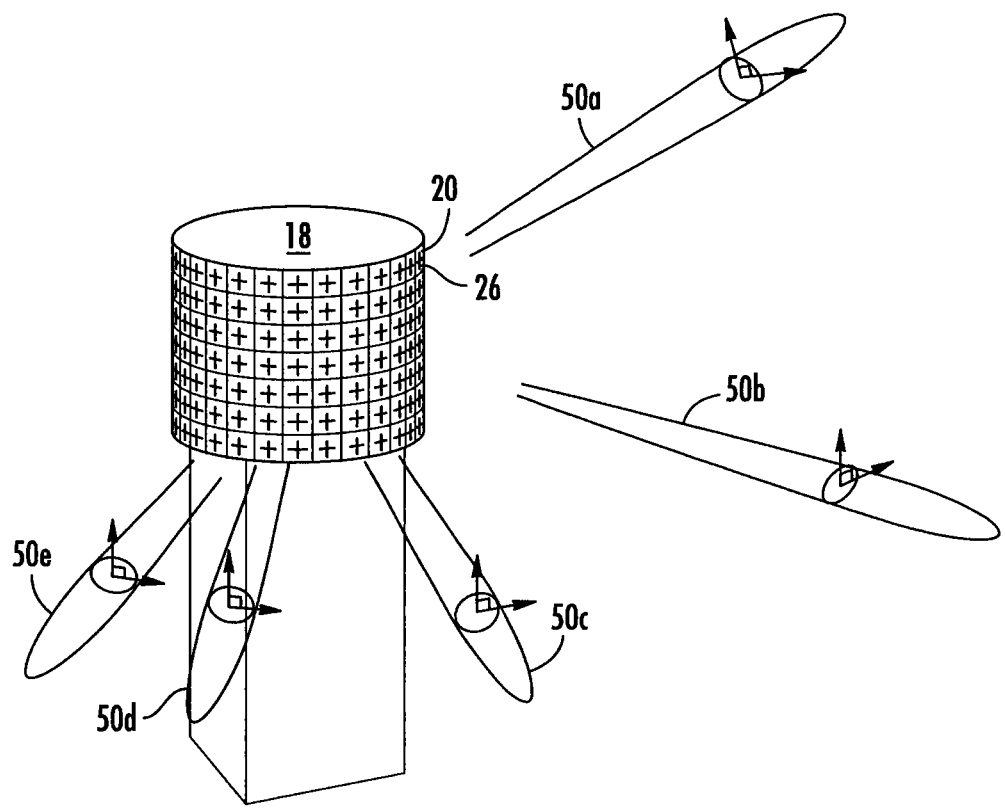
FIG. 2b is a perspective view of a version of the polarimetric phased array antenna.
Figure 4A:
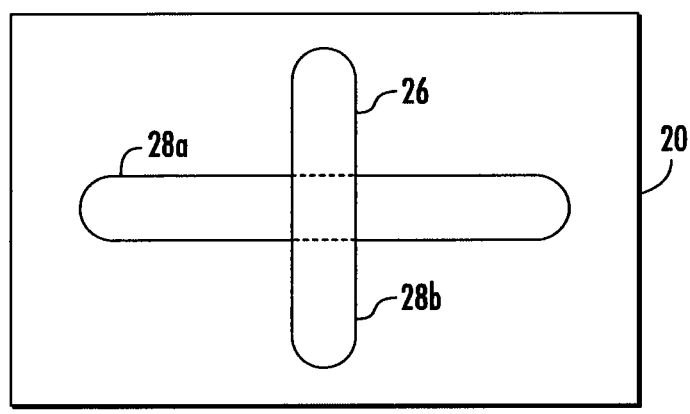
FIGS. 4a and 4b are side elevational views of exemplary panels of the polarimetric phased array antenna having a dual-polarization capability with either a single element (FIG. 4a) or interlaced cross polar radiating rectangular apertures/patches (FIG. 4b) that preferably have proven low cross polar radiation.

The switching network 22 communicates with the panels 20 such that at least one of power, radar and control signals are sent to and received from one or more selected panels 20. One or more (and in one embodiment all) of the plurality of the panels 20 include a dual polarization antenna 26 (see the plus signs in FIG. 2, and FIG. 4a) as well as other elements that are not shown and would be known by one skilled in the art for forming, steering and/or receiving at least one single and/or dual polarization electromagnetic beam having preselected characteristics, such as a communication network, buffers or the like.

Figure 4B:
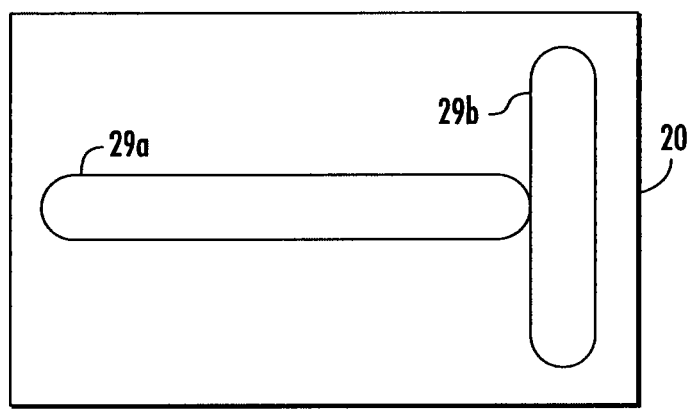
Figure 5:
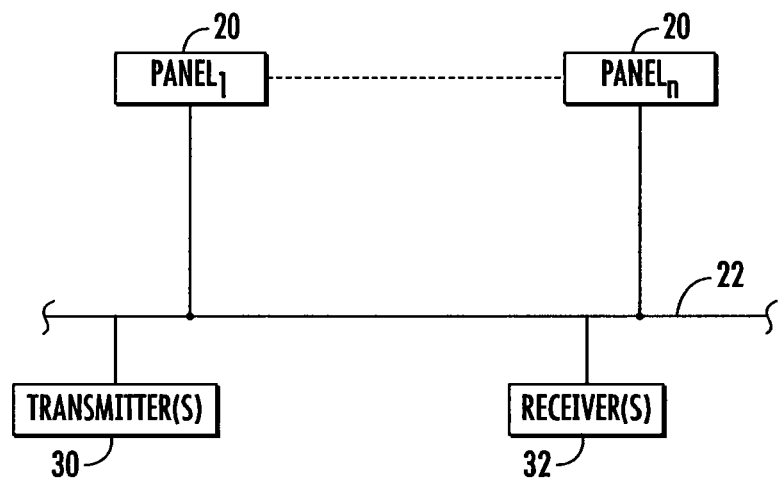
FIG. 5 is a schematic view of a switching network establishing communication between multiple panels of the polarimetric phased array antenna and one or more transmitter and receiver of the radar control and processing system.

Panels 20 can also or in the alternative include a single polarization antenna, for example. For example, the panels 20 can include interlaced single polarized radiating elements 29a and 29b arranged in an interlaced fashion as shown in FIG. 4b to form two orthogonally polarized radiating fields. The dual polarization antenna 26 will be discussed herein by way of example. The dual polarization antenna 26 can be referred to herein as "dual polarization antenna element". The dual polarization antenna element 26 is formed using any suitable hardware, such as a patch antenna configuration (e.g., having a single element with two different antenna areas for forming the dual polarization electromagnetic beam), a dipole antenna configuration, or a pair of dipoles 28a and 28b. The pair of dipoles 28a and 28b can be constructed of conductive element(s) arranged in a cross-pattern. The dual polarization antenna element 26 can also be formed of either dipoles and/or aperture(s) and/or a patch.

The radar control and processing system 14 is provided with a variety of equipment that is used to form the electromagnetic signals which are directed to one or more of the selected panels 20 (e.g., independent panels or groups of panels) such that the selected panels 20 form single or dual polarization electromagnetic beams. When two or more panels 20 are selected, such selected panels 20 cooperate to form the dual polarization electromagnetic beam. The radar control and processing system 14 is also provided with equipment for reading signals sensed at $\vec{r} = a_x R \cos \phi_n + a_y R \sin \phi_n + a_z z_m$ on one or more selected panels 20 (e.g., independent panels or groups of panels) and for decoding the signals into an electronic radar output.

In general, the radar control and processing system 14 can be provided with one or more transmitters 30, one or more receivers (two being shown by way of example as 32a and 32b), one or more communication servers 34, one or more digital signal processors 36, one or more synchronizers 38, one or more RF sources 40, one or more data acquisition units 42, one or more host computer 44, and one or more user/maintenance workstation 46 communicating with each other, as shown for example, in FIG. 1. The radar control and processing system 14 can be constructed in a variety of manners using a combination of one or more hardware and one or more software elements. For example, a discussion of suitable hardware and/or software elements forming the elements of the radar control and processing system 14 is described in Exhibit A of the provisional patent application identified by U.S. Ser. No. 61/261,695, with the exception that such hardware and/or software elements, such as the synchronizer depicted in FIG. 1 and described on page 259 can be modified to cause the transmitter(s) and/or receivers(s) to communicate with (e.g., send and receive signals) particular one(s) of the panels 20 at known location(s) or pointing in known direction(s). For example, the synchronizer 38 can have access to (or be programmed with) addresses specifically identifying the panels 20, data indicative of the location(s) of the panel(s) 20, and/or data indicative of the direction in which the panel(s) are facing, and then digital or analog commands generated by the synchronizer 38 can include the address of the particular panel(s) 20 to send and/or receive signals from one or more selected panel 20.

The synchronizer 38 of the radar control and processing system 14 can use any suitable protocol or control sequence for driving the panel(s) 20 of the polarimetric phased array antenna 12. For example, suitable protocols referred to as "simultaneous transmitting and simultaneous receiving (STSR) mode" and "alternating transmitting but simultaneous receiving (ATSR)" are described in Exhibit B of the provisional patent application identified by U.S. Ser. No. 61/261,695. As would be understood by one skilled in the art, some of the components within the radar control and processing system 14 are optional, such as the one or more communication servers 34, one or more digital signal processors 36, one or more synchronizers 38, one or more data acquisition units 42, and one or more host computer 44.

When the support system 18 includes a movable pedestal, the radar control and processing system 14 can also include an antenna pedestal control as discussed in Exhibit A of the provisional patent application identified by U.S. Ser. No. 61/261,695.

Figure 3:
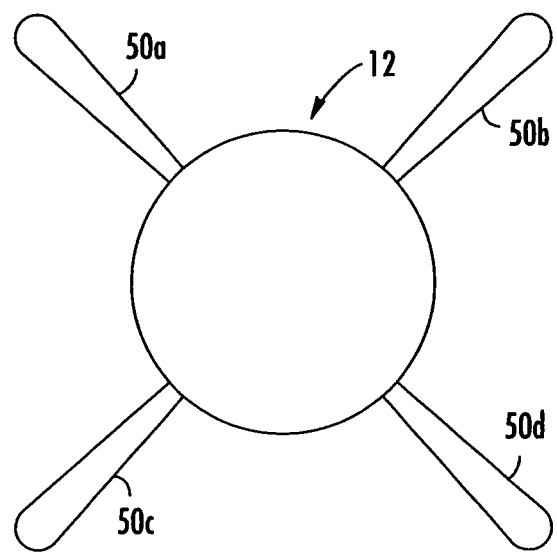
FIG. 3 is a schematic diagram of four dual polarization electromagnetic beams being simultaneously emitted by the polarimetric phased array antenna.

In various aspects, the radar data acquisition system 10 includes a variety of advantages, such as the allowance of simultaneous multi-beams 50a-d (FIG. 3) to utilize the polarimetric phased array antenna 12 for data acquisition while maintaining high-quality polarimetric data. For example, in one embodiment, the polarimetric phased array antenna 12 can have a measurement error for the differential reflectivity within 0.2 dB and for copolar cross-correlation coefficient within 0.02; the simultaneous use of multiple beams 50a-d, for example, emitted from and/or received by the polarimetric phased array antenna 12; and the maintenance of cross-polarization isolation. In particular, the polarimetric phased array antenna 12, by way of example, can allow simultaneous (or alternating) multi-beams 50a-d to utilize the antenna resource for data update while maintaining high-quality polarimetric data.

The number of simultaneous or alternating beams may be chosen to be 2, 3, 4, or the like and in one aspect of the invention provides radar coverage of 360 degrees around the polarimetric phased array antenna 12 with electronic steering and/or scanning of the beam(s) 50 in the horizontal and vertical directions. When four beams 50a-d are transmitted and/or received, the polarimetric phased array antenna 12 functions similarly to a SPY-1A radar having four antenna faces with each antenna face providing coverage of approximately 90 degrees. But, the polarimetric phased array antenna 12 can maintain the same beam width and polarization characteristics with axial symmetry. When the polarimetric phased array antenna 12 is used to simultaneously transmit only two beams 50 (not shown), such beams 50 can be transmitted in the back to back directions and a maximal aperture can be used so that the finest resolution desired can be achieved. It should be noted that the synchronizer 38 can be programmed to vary the size of the aperture and/or the resolution. By considering the trade-off between the resolution and update time, three beams may be an adequate choice, as the antenna aperture for each beam can be reduced only 13% from the maximum.

The radar data acquisition system 10 having the polarimetric phased array antenna 12 can be used for practically scan-invariant weather measurements. In this regard, the polarimetric phased array antenna 12 has azimuth scan-invariant properties and has very minor dependence on elevation at low elevation angles. Because the WSR-88D scan strategy has coarser elevation sampling at higher elevation angles, and because the angular resolution of the polarimetric phased array antenna 12 coarsens as beam elevation angle increases (thus filling angular gaps created by coarser sampling), the gradual decrease in elevation resolution is a beneficial feature.

Referring again to FIG. 2b, there may be M×N dual polarization antennas 26 arranged azimuthally (M) and axially (N) on panels 26 forming an outer surface 100 of a cylinder 102. Multiple simultaneous beams 50 can be formed with each beam 50 generated from a sector (or panel 20) of the outer surface 100 with a broadside direction, i.e., front looking direction, along a center, i.e., bisector, of the illuminated sector. A sector is defined as a collection of contiguous panels 20 that work together to create the beam 50. For example, if four beams 50 will be generated by the polarimetric phased array antenna 12, then four 90 degree sectors can be defined and all of the panels 20 within a particular sector can be used to form the beam 50. The beam 50 is preferably emitted from a center of the sector. Using a cylindrical configuration for the polarimetric phased array antenna 12, polarization orthogonality is preserved in all directions.

Figure 6:
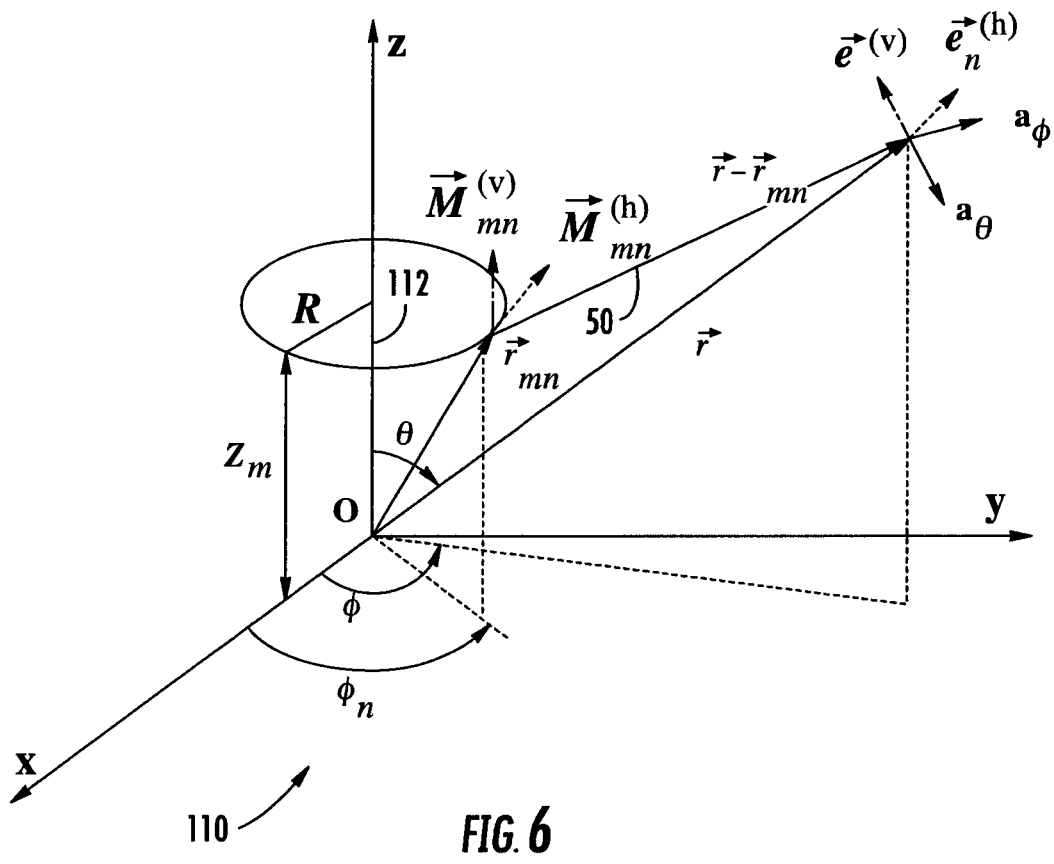
FIG. 6 is a diagram showing a coordinate system for the polarimetric phased array antenna constructed in accordance with the present invention.

Referring now to FIG. 6, shown therein is an exemplary coordinate system 110 which will be used to describe the radiation characteristics of the cylindrical configuration for the polarimetric phased array antenna 12 utilized by the radar control and processing system 14 for forming the electromagnetic signals which are directed to the one or more panels 20, as well as for reading signals sensed by the polarization antennas 26 of the panels 20 and for decoding the signals into an electronic radar output indicative of weather information, target detection and/or recognition in military and/or civilian applications. The coordinate system 110 includes a z direction along an axis 112 of the cylinder 102. One of the polarization antennas 26 shown located at mn: $m^{th}$ row, $n^{th}$ column, is comprised of dipoles 28a and 28b with one of the dipoles shown by the notation "h" in FIG. 6, and the other dipole shown by the notation "v". The dipoles h and v are located at $\phi_n, z_m$ on the surface 100 at $\vec{r}_{mn\ mn} = a_x R \cos \phi_n + a_y R \sin \phi_n + a_z z_m$ where R is a radius of the cylinder 102, the row height $z_n$, ranges from $-D/2$ to $+D/2$ where D is the axial length of the cylindrical array (equal to the diameter D of the WSR-88D), and the bold unit vectors represent the Cartesian coordinates. Azimuth location $\phi_n$ is measured relative to an x axis and is $\phi_n = n \Delta \phi$, $n = 1, 2, 3 \ldots$. The electric field at $\vec{r} = a_x r \sin \theta \cos \phi + a_y r \sin \theta \sin \phi + a_z r \cos \theta$, transmitted by the $mn^{th}$ q (i.e., $q = h$ or $v$) dipole, is (Ishimaru 1997, Section 2.4)

$$\vec{E}_{mn}^{(q)}(\vec{r}) = -\frac{k^2 e^{-jk|\vec{r}-\vec{r}_{mn}|}}{4\pi\varepsilon |\vec{r}-\vec{r}_{mn}|} \vec{M}'^{(q)}_{mn}(\theta, \phi), \tag{1a}$$

where $k = 2\pi/\lambda$, $\lambda$ is the radar wavelength, $\epsilon$ is the permittivity for an assumed uniform precipitation-free atmosphere, $$\vec{M}'^{(q)}_{mn}(\theta,\phi) = a_r \times [a_r \times \vec{M}_{mn}^{(q)}] \text{[Coulomb-meter]} \tag{1b}$$

where $\vec{M}_{mn}^{(q)}$ is the moment of dipole q at location mn, and $a_r$ is the unit vector along $\vec{r}$.

Using the far-field approximation, we have the electric field at $\vec{r}$ radiated by the $mn^{th}$ q dipole $$\vec{E}_{mn}^{(q)} = \begin{bmatrix} E_{mn}^{(h)} \\ E_{mn}^{(v)} \end{bmatrix} \approx A e^{jk[z_m \cos\theta + R \sin\theta \cos(\phi-\phi_n)]} \begin{bmatrix} M'^{(h)}_{mn} \\ M'^{(v)}_{mn} \end{bmatrix} \tag{2a}$$

where $$A \equiv -\frac{k^2 e^{-jkr}}{4\pi\varepsilon r}. \tag{2b}$$

Figure 8A:
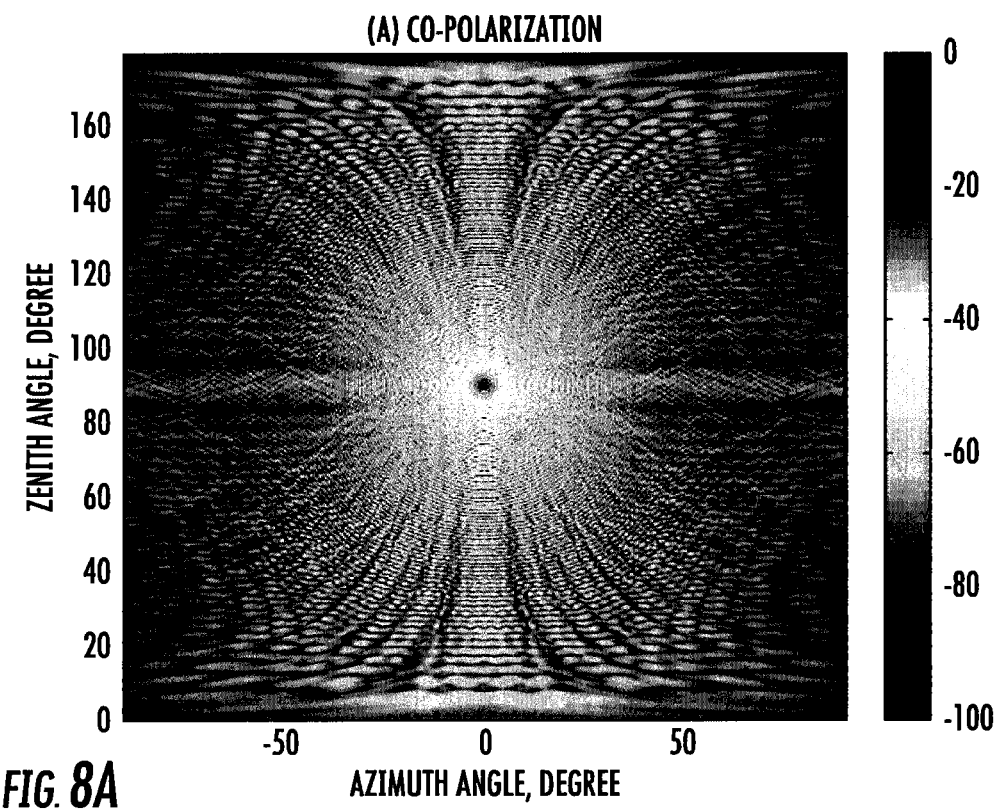
FIGS. 8(a) and 8(b) are graphs showing copolar and cross-polar one-way power density patterns as a function of azimuth and zenith angle
Figure 8B:
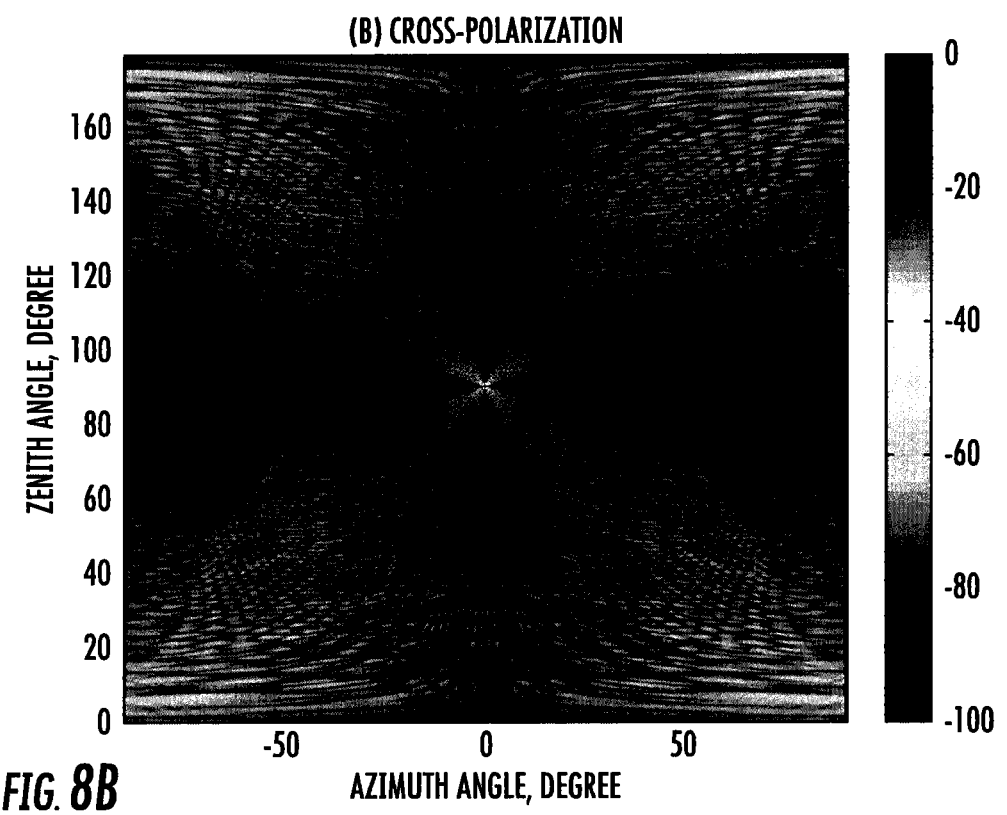
Figure 9A:
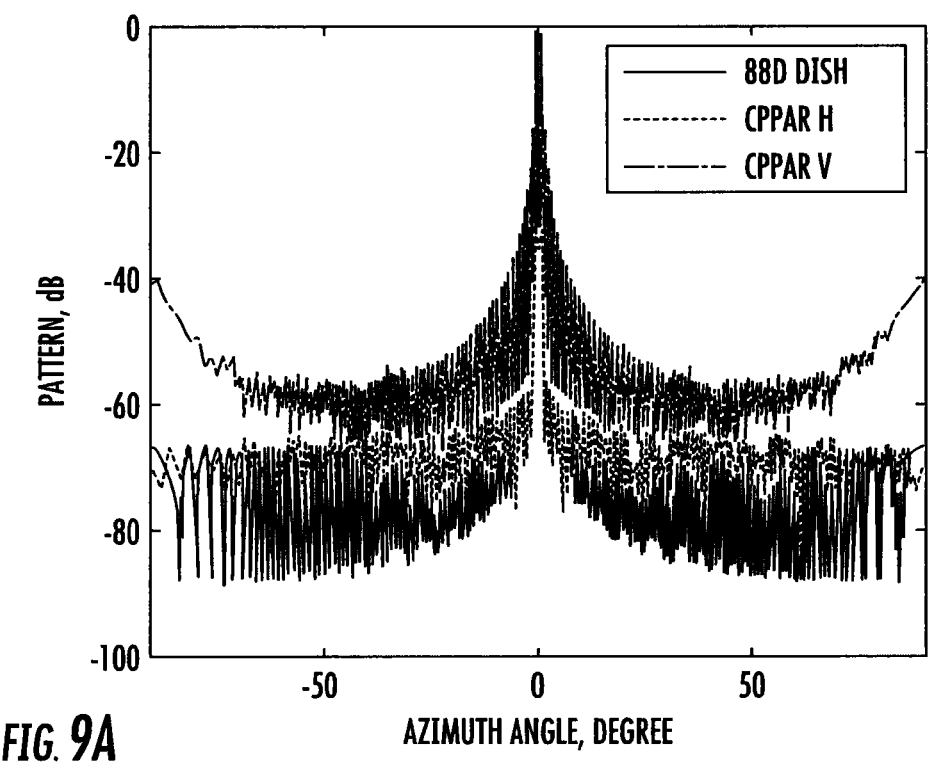
FIGS. 9(a), 9(b), 9(c) and 9(d) are simulated one-way power density patterns for a four-beam configuration and element spacing of $0.5\lambda$ without tapering, density adjustment, or polarization compensation.
Figure 9B:
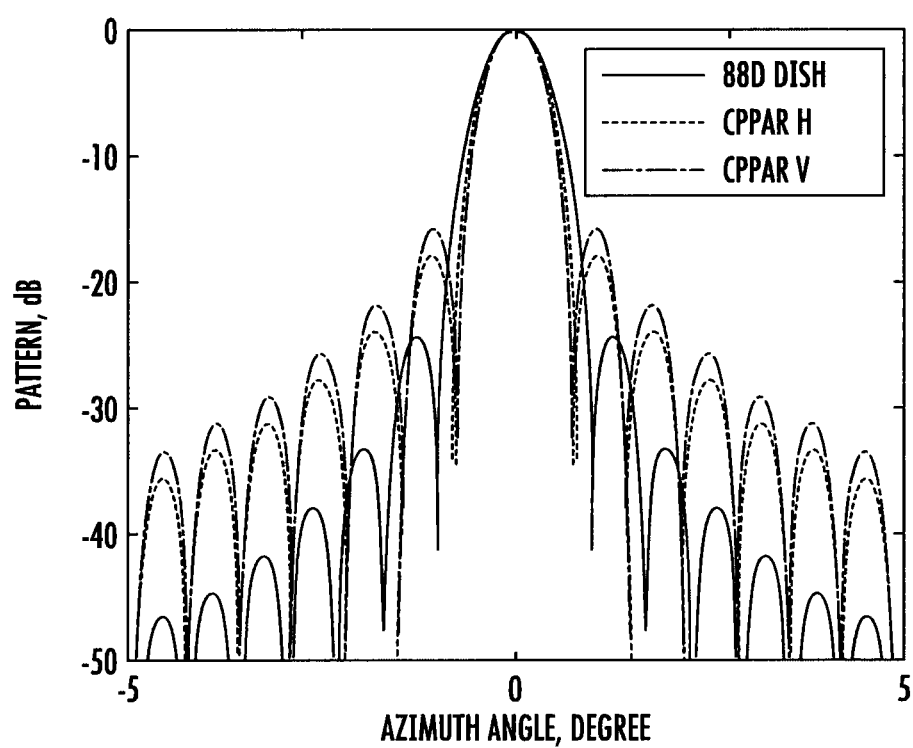
Figure 9C:
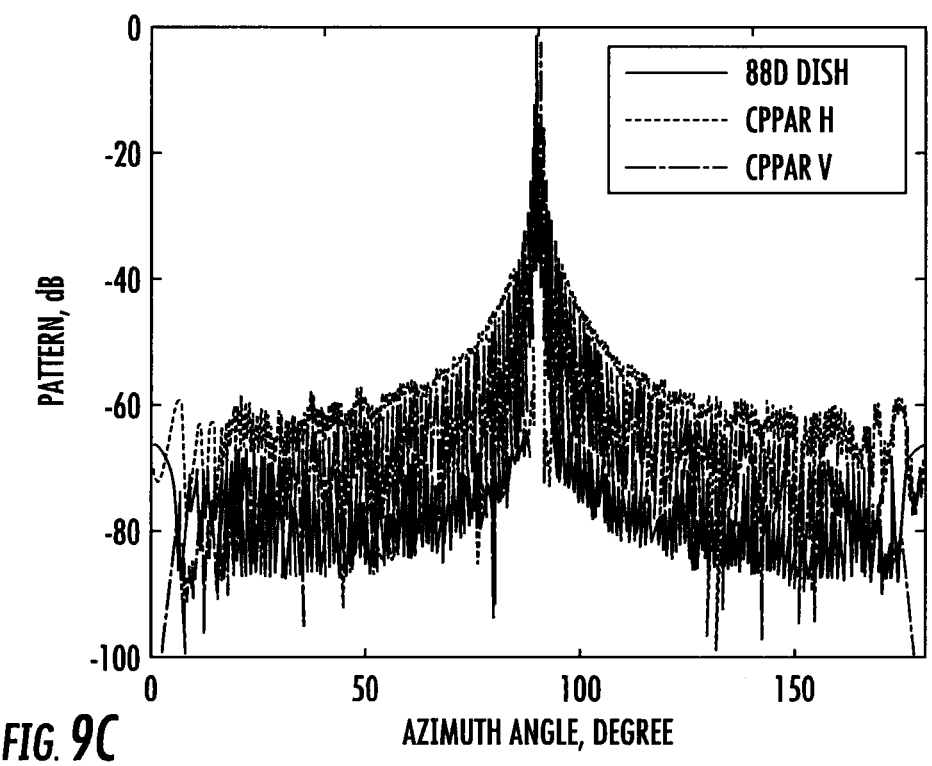
Figure 9D:
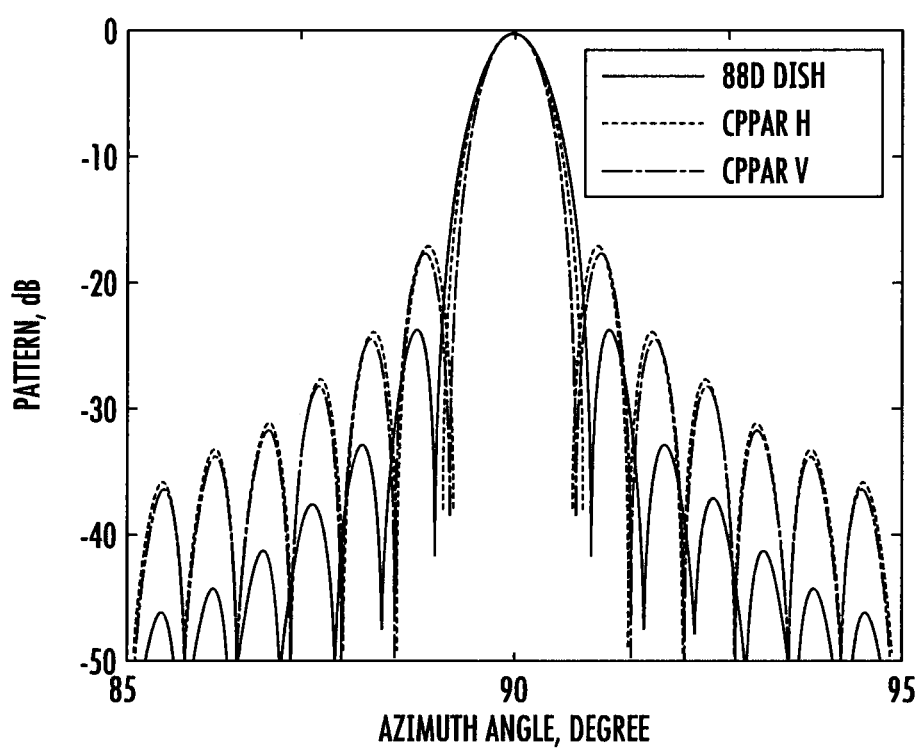
Figure 10A:
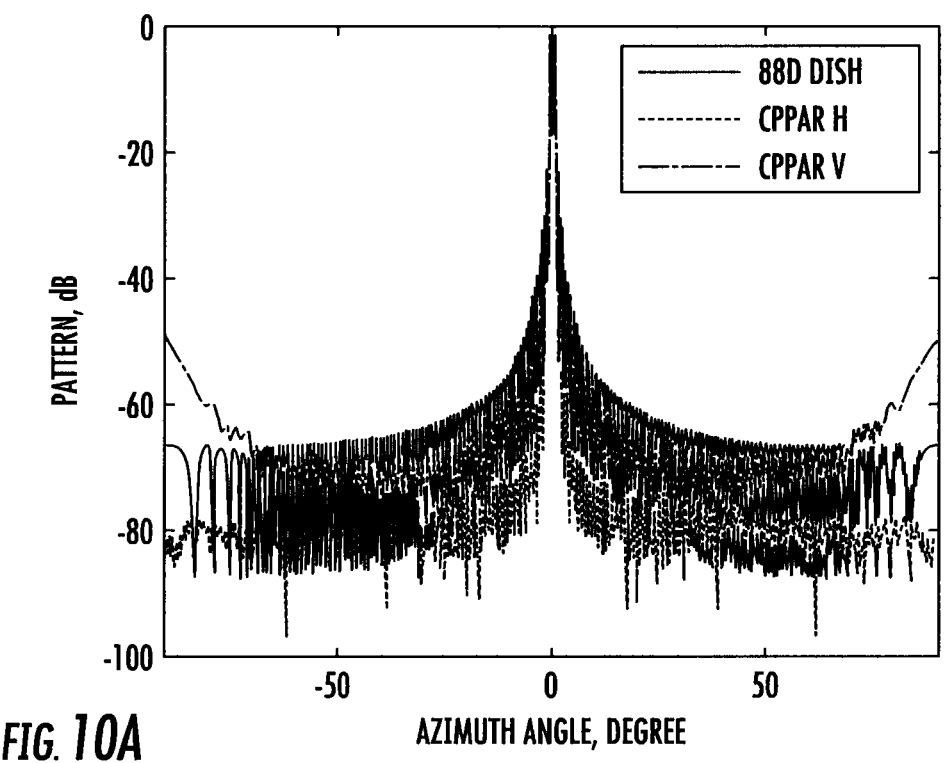
FIGS. 10(a), 10(b), 10(c) and 10(d) are simulated one-way power density patterns for the four-beam configuration and element spacing of $0.5\lambda$ with tapering, but without density adjustment, or polarization compensation.
Figure 10B:
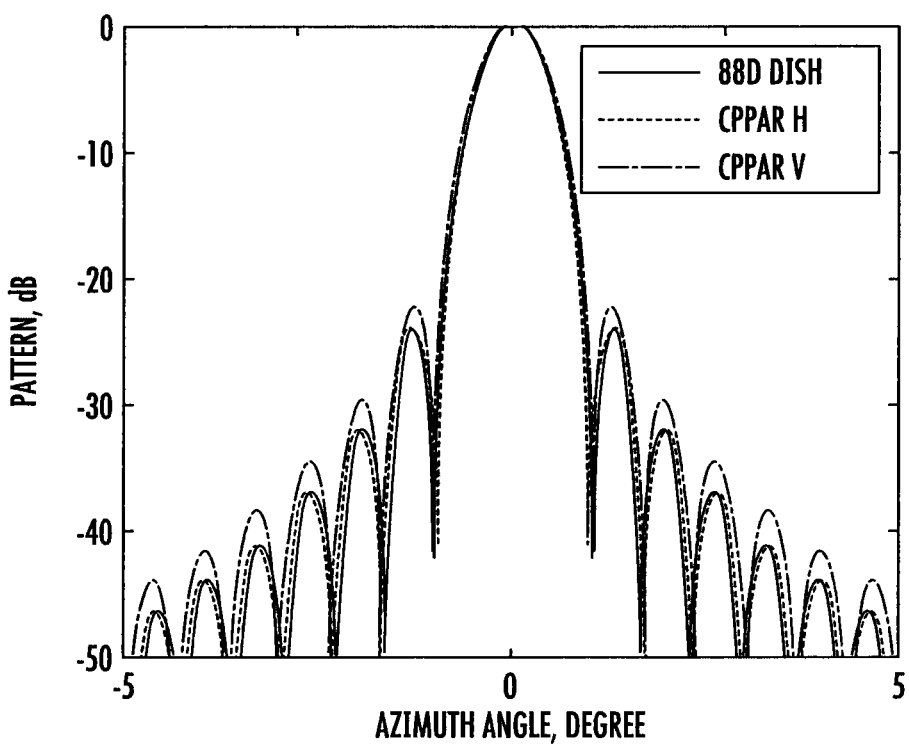
Figure 10C:
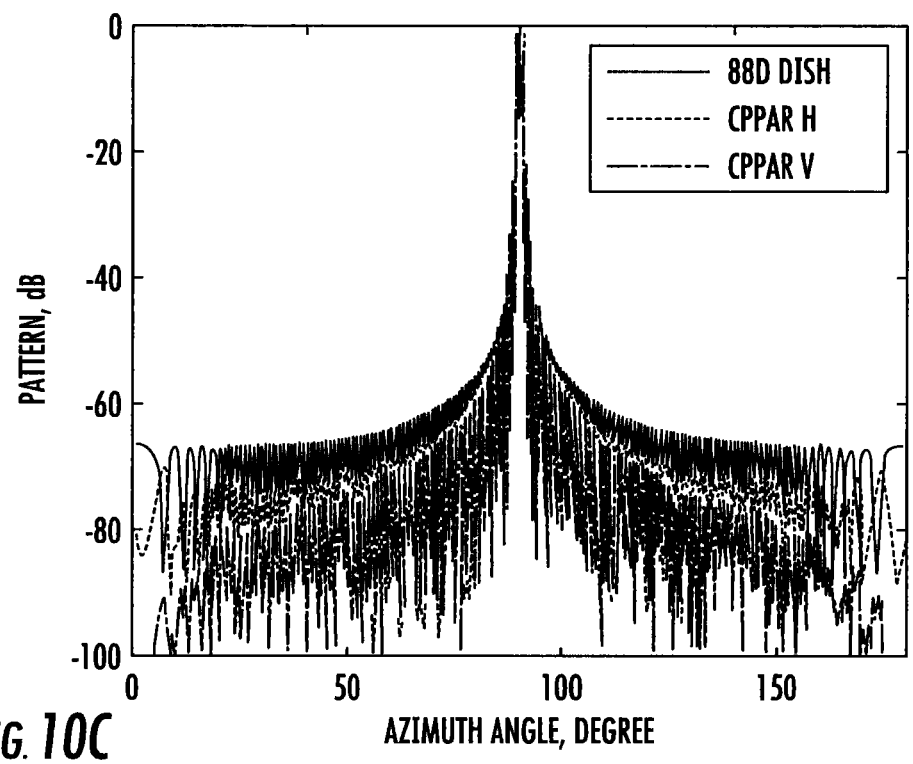
Figure 10D:
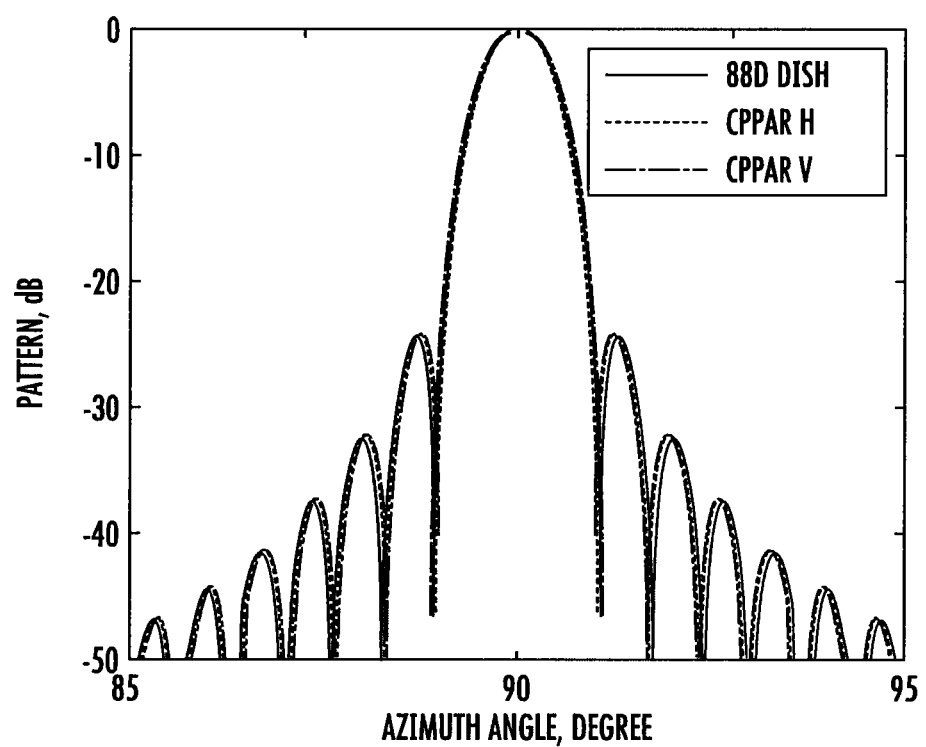
Figure 11A:
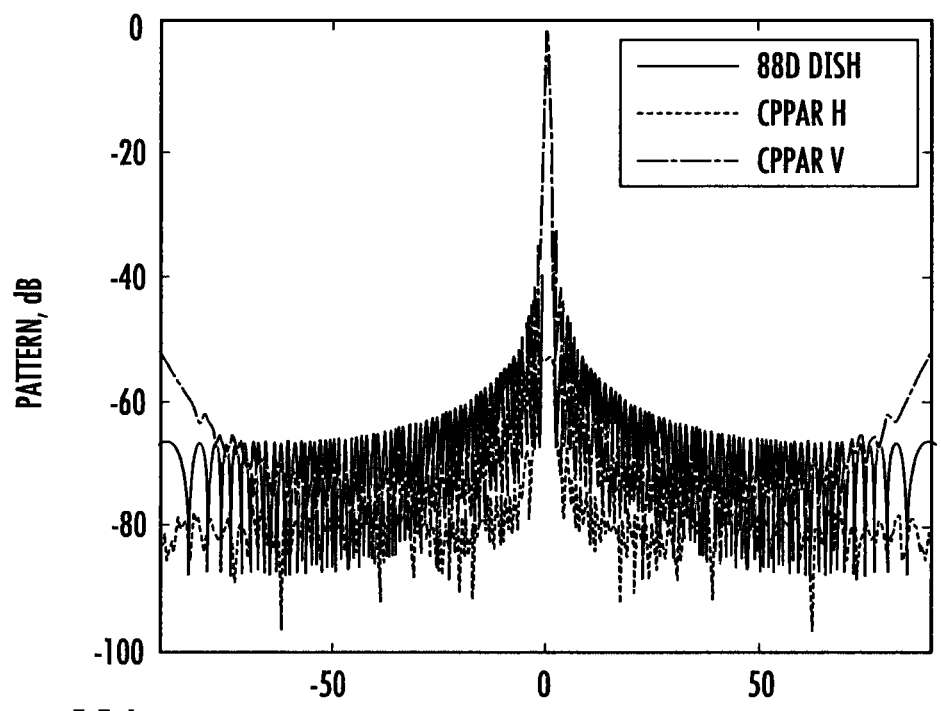
FIGS. 11(a), 11(b), 11(c) and 11(d) are simulated one-way power density patterns for the four-beam configuration and element spacing of $0.5\lambda$ with tapering, element density correction and polarization compensation.
Figure 11B:
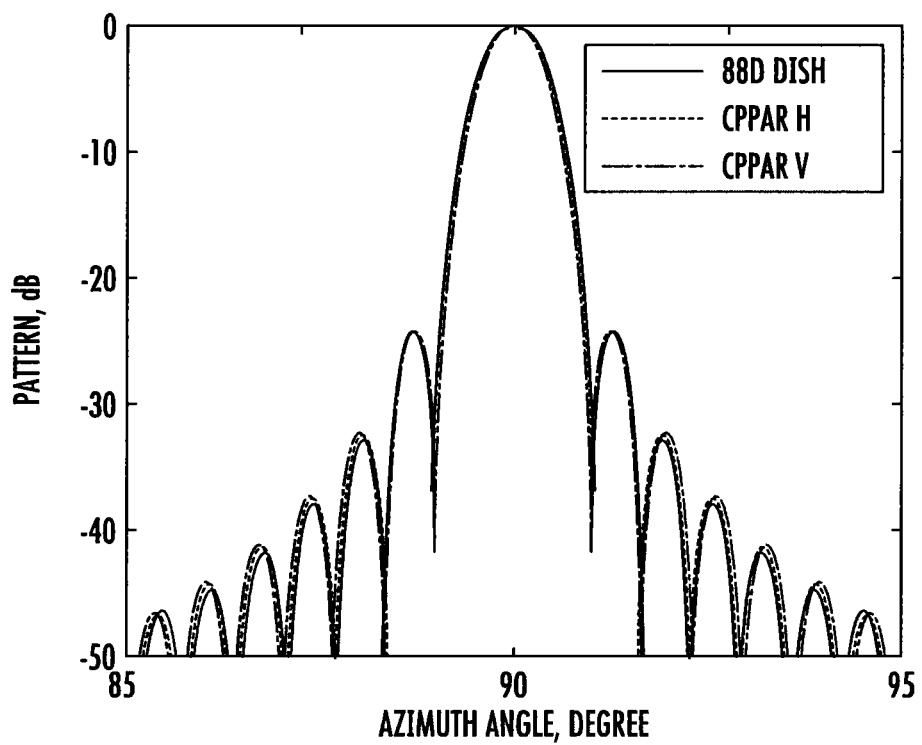
Figure 11C:
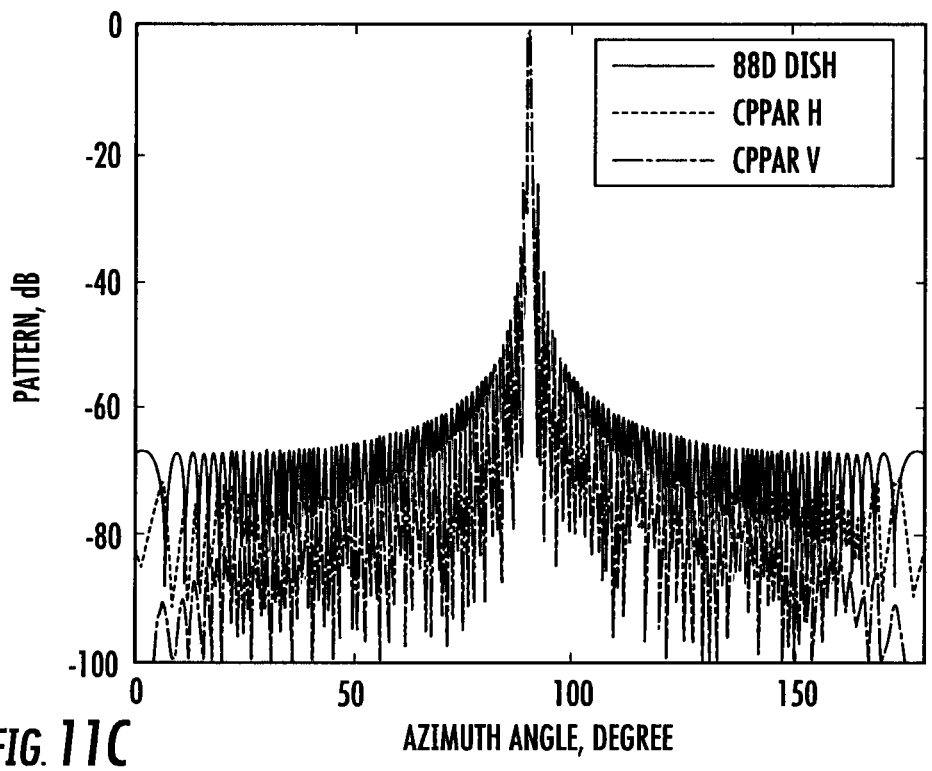
Figure 11D:
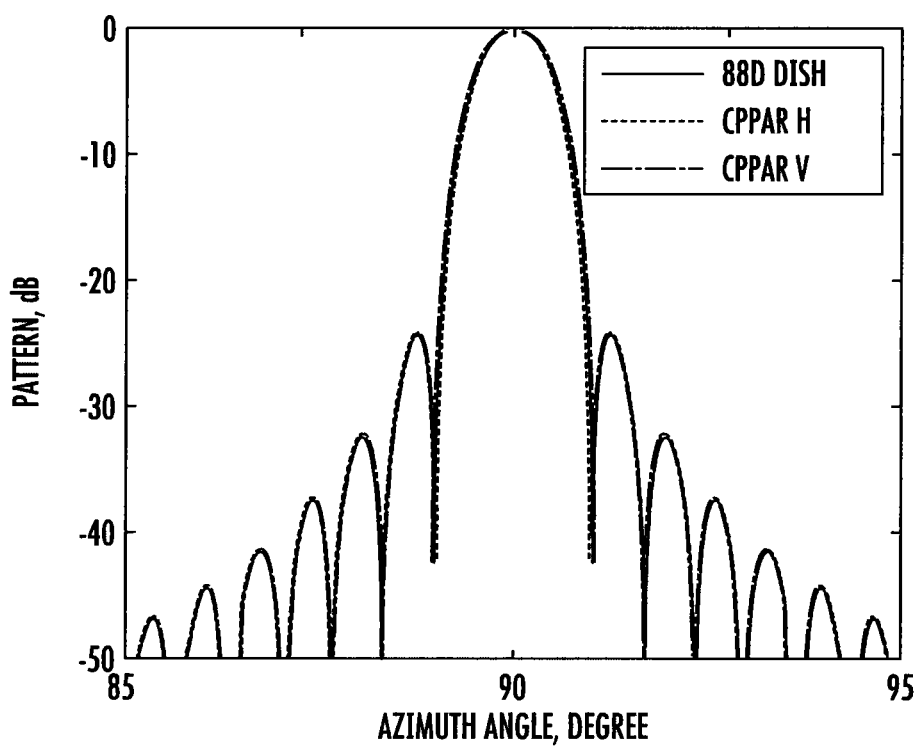

The superscript (h) is used to identify the dipole 28a (which extends in a horizontal direction as shown in FIG. 4), and the superscript (v) is used to identify the dipole 28b (which extends in a vertical direction as shown in FIG. 4). Following the procedure of Zhang et al., (2009a), the electric fields can be expressed in the plane of polarization (Doviak and Zrnic, 2006, Fig. 8.15) at $\vec{r}$ as $$\vec{E}_{tmn}^{(h)} = E_{tmn}^{(h)} \vec{e}_n^{(h)}, \text{ and } \vec{E}_{tmn}^{(v)} = E_{tmn}^{(v)} \vec{e}_n^{(v)} \tag{3a,b}$$

where $E_{t\ mn}^{(h)}$ and $E_{t\ mn}^{(v)}$ are the fields respectively transmitted by the h and v dipoles along the normal to the plane of the dipoles (i.e., the crossed dipole's broadside direction) located at $\phi_n, z_m$. Thus, $$E_{tmn}^{(h)} = A e^{jk[z_m \cos\theta + R \sin\theta \cos(\phi-\phi_n)]} M_{mn}^{(h)}, \tag{3c}$$

with a like expression for $E_{t\ mn}^{(v)}$, and $\vec{e}_n^{(h)}$ is $$\vec{e}_n^{(h)} = a_{y'} - [a_{x'} \sin\theta \cos(\phi-\phi_n) + a_{y'} \sin\theta \sin(\phi-\phi_n) + a_z \cos\theta] \sin\theta \sin(\phi-\phi_n), \tag{3d}$$

a form analogous to Eq. (5a) of Zhang et al. (2009a), but one that accounts for the $\phi_n$ angular rotation about z of the coordinate x, y axes, to x',y' for $mn^{th}$ element. $\vec{e}^{(v)}$ is $$\vec{e}^{(v)} = a_z \sin^2\theta - [a_{x'} \cos\phi + a_{y'} \sin\phi] \sin\theta \cos\theta, \tag{3e}$$

which is identical to that given by Eq. (5b) of Zhang et al., (2009a). Note that $\vec{e}_n^{(h)}$ is a function of dipole location but $\vec{e}^{(v)}$ is not, and, as pointed out by Zhang et al. (2009a), $\vec{e}_n^{(h)}$ is not orthogonal to $\vec{e}^{(v)}$.

To form a beam pointing in the $(\theta_0, \phi_0)$ direction, a phase shift $$\psi_{mn} = -k[z_m \cos\theta_0 + R \sin\theta_0 \cos(\phi_0-\phi_n)] \tag{4}$$

is applied to each of the mn polarization antenna element 26 that are used to form the beam 50. The phase shifts given by (4) produce the beam 50 in the $(\theta_0, \phi_0)$ direction.

The incident horizontal and so-called "vertical" (i.e., the vertical field lies in the vertical plane, but is only vertical at the 90° zenith angle) fields $E_{ihmn}$ and $E_{ivmn}$ in the plane of polarization are given by (Zhang et al., 2009a)

$$\begin{bmatrix} E_{ih\ mn} \\ E_{iv\ mn} \end{bmatrix} = A P_{mn} \begin{bmatrix} |M_{mn}^{(h)}| \\ |M_{mn}^{(v)}| \end{bmatrix} \exp(j\psi_{mn}^{(0)}) \tag{5a}$$

where $$\psi_{mn}^{(0)} = k\{z_m[\cos\theta - \cos\theta_0] + R[\sin\theta\cos(\phi-\phi_n) - \sin\theta_0\cos(\phi_0-\phi_n)]\},$$

and $$P_{mn} \begin{bmatrix} \cos(\phi-\phi_n) & 0 \\ -\cos\theta\sin(\phi-\phi_n) & \sin\theta \end{bmatrix} \tag{5b}$$

is a matrix that projects the polarization antenna element 26's broadside electric field to the plane of polarization at $\vec{r}$, and accounts for h dipole orientation at $\phi_n$. In this analysis we assume that each dipole 26a and 26b radiates only into the outward hemisphere having an equator in the plane of the crossed dipole 26a and 26b. Magnitude signs are placed around the dipole moment to emphasize that the dipole phase is incorporated into $\psi_{mn}^{(0)}$. Although the subscript index 'm' does not appear in the matrix, it is attached to $P_{mn}$ to emphasize that the projection applies to the $mn^{th}$ h and v dipoles. The subscript 'h' and 'v' on $E_{ihmn}$ and $E_{ivmn}$ denotes these are the horizontal and "vertical" fields transmitted by the $mn^{th}$ dipoles and incident on the scatterer; note $E_{ivmn}$ has contributions from both the h and v dipole moments, whereas $E_{ihmn}$ depends only on the h dipole's moment.

Radiation patterns with specified sidelobe levels and beamwidths can be achieved with a proper weight ($w_{mn}^{(q)}$) applied to each polarization antenna element 26. Hence, the total incident field at $\vec{r}$ is the weighted contributions from all the active polarization antennas 26 used to form the beam 50 at $(\theta_0,\phi_0)$. This field can be expressed as $$\vec{E}_i = \begin{bmatrix} E_{ih} \\ E_{iv} \end{bmatrix} = A \sum_{m,n} P_{mn} W_{mn} \begin{bmatrix} |M^{(h)}| \\ |M^{(v)}| \end{bmatrix} \exp(j\psi_{mn}^{(0)}) \quad (6)$$

where the weighting matrix $W_{mn}$ is applied to each polarization antenna element 26 used to form the beam 50, and the angular dependence of the broadside field generated by the $mn^{th}$ h and v dipole moments is incorporated into $W_{mn}$; that is all dipoles 26a and 26b have $M^{(h)}=M^{(v)}$ which is taken to be the dipole's source excitation modulated by $W_{mn}$. $E_{ih}$ is the total horizontal field generated by all the h and v dipoles that are used to form the beam 50. Because the h dipoles change orientation depending on their azimuth $\phi_n$, the weighting vector can be expressed as $$W_{mn} = \begin{bmatrix} \frac{1}{\cos(\phi_0 - \phi_n)} & 0 \\ 0 & \frac{1}{\sin\theta_0} \end{bmatrix} w_{mn}^{(i)}, \quad (7a)$$

where the upper-left matrix element $$\frac{1}{\cos(\phi_0 - \phi_n)}$$

compensates for the projection loss of the H-dipole radiated field onto the horizontal polarization direction along the boresight of the beam 50. In a preferred embodiment, the boresight always lies in the plane containing the bisector of the angle encompassing the azimuth sector containing the dipoles 26a and 26b forming the beam 50; in effect the boresight of the cylindrical configuration for the polarimetric phased array antenna 12 is always in the broadside direction. Alternatively $$\phi_n = n\Delta\phi = \phi_0 \pm n'\Delta\phi = (n_0 \pm n')\Delta\phi, [n'=0,1,2,\ldots N_a], \quad (7b)$$

is the location of the active dipoles 26a and 26b in an angular sector (e.g., 120° for a 3 beam CPPAR) centered on $\phi_0$ with $(2N_a+1)$ active array elements in the azimuthal span of $[n_0-N_a, n_0+N_a]$. Likewise, the lower-right matrix element $$\frac{1}{\sin\theta_0}$$

compensates for the projection loss of the V-dipole radiated field onto the vertical direction; this correction is normally close to unity because the elevation angle $(\pi/2-\theta_0)$ for weather measurements is typically small.

The scalar weight $w_{mn}^{(i)}$ is for isotropic radiators; these weights are selected to control the sidelobe levels. The WSR-88D antenna pattern is mimicked by selecting $$w_{mn}^{(i)} \left( \frac{\{1 - 4[R^2\sin^2(\phi_0 - \phi_n) + z_m^2]/D^2\} + b}{1 + b} \right) \cos(\phi_0 - \phi_n). \quad (8)$$

The term in the parenthesis is equivalent to the WSR-88D illumination taper but applied to those $mn^{th}$ dipoles whose projection onto the vertical plane bisecting the cylinder lies within the $\pi D^2/4$ area where D is the diameter of the WSR-88D dish antenna (dipoles outside this circular area, but lying within the angular sector of elements forming the beam 50, have zero weight); the $\cos(\phi-\phi_0)$ term accounts for the change of the density of the array elements projected onto the vertical plane and the term b=0.16 accounts for edge illumination of the WSR-88D reflector (Doviak et al., 1998). Although $w_{mn}^{(i)}$ mimics the illumination taper on the WSR-88D antenna for the boresight direction, the analogy no longer exists for azimuths in off-boresight directions. This is because the polarization antennas 26 that are active on the cylinder 102 have a density that lacks the symmetry of the dish antenna about the vertical bisector of the circular area.

On the beam's boresight (i.e., $\theta=\theta_0$, $\phi=\phi_0$), the radiated fields from all the polarization antennas 26 are in phase so the phase term in (6) disappears and the incident wave field becomes $$\vec{E}_i = A \sum_{m,n} P_{mn} W_{mn} |\vec{M}^{(q)}|. \quad (9)$$

Because the polarization antennas 26 that are active and the weighting factor $w_{mn}^{(i)}$ are symmetric about $\phi_0$ and $z_m=0$, there is no on-axis cross-polar radiation. That is, within a sector, the vertically polarized wave field caused by the horizontal dipole 28a at $\phi_0-n'\Delta\phi$ cancels that field from the horizontal dipole 28a at the opposite azimuth $\phi_0+n'\Delta\phi$. This cross-polar null on-axis is important for accurate polarimetric radar measurement of precipitation (Wang and Chandrasekar 2006; Zrnic et al. 2010). This is one of the main reasons for using the cylindrical configuration for the polarimetric phased array antenna 12 commutating scan in which the beam direction changes in azimuth by shifting a column of active polarization antennas 26, and maintaining the weights symmetry about the beam center. This way, the beam characteristics of the cylindrical configuration for the polarimetric phased array antenna 12 are scan invariant; not so for the planar polarimetric phased array radar discussed in the Background section.

Given the field incident on a hydrometer, the scattered wave field can be expressed as [Doviak and Zrnic 2006, Section 8.5.2.1]

$$\vec{E}_s = \begin{bmatrix} E_{sh} \\ E_{sv} \end{bmatrix} = S' \vec{E}_i \times \frac{\exp(-jkr)}{r}, \quad (10)$$

where S' is the backscatter matrix of a hydrometeor and includes propagation effects (Zhang et al. 2009a).

Although (10) can give the H, V electric fields at any receiving polarization antenna element 26 in the array, the fields parallel to the respective dipole axis should be determined. The fields parallel to the dipole axes are obtained by projecting $\vec{E}_{s\,mn}$ onto the respective dipole directions, and with the proper weighting and phase shifts. In this case the total received wave field is expressed as $$\vec{E}_r = \sum_{m,n} W_{mn} P^t_{mn} \vec{E}_{smn} e^{-j\psi_{mn}} \quad (11)$$

$$= \sum_{m,n} W^t_{mn} P^t_{mn} S' P_{mn} W_{mn} \vec{M}^{r(q)} \times \left(-\frac{k^2}{4\pi\varepsilon}\right) \frac{\exp(-2jkr)}{r^2}.$$

Figure 7:
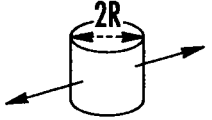
FIG. 7 is a table of exemplary designs for a polarimetric phased array antenna with two, three or four dual polarization electromagnetic beams being simultaneously emitted by the polarimetric phased array antenna.
Figure 7:
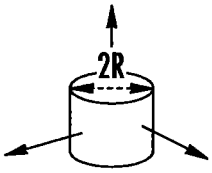
Figure 7:
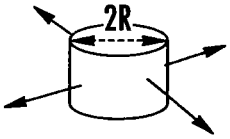
Figure 7:
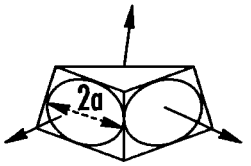
Figure 7:
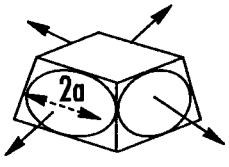

The operational WSR-88D radar has high performance for meteorological observations: it has a dish antenna with a diameter of 8.54 m, a beam width of about 1 degree, and the first sidelobe below −26 dB. It is desirable for the cylindrical configuration for the polarimetric phased array antenna 12 to have similar or better performance. FIG. 7 shows a table of the specifics of sample designs for the cylindrical configuration for the polarimetric phased array antenna 12 with two, three, or four beams 50; each mimics the NEXRAD beamwidth at the largest electronic scan angle, and element separations used are 1.0, 0.75 and 0.5 wavelength. Considering the tradeoff for maximizing the effective aperture and the number of beams 50, it is efficient to use either three or four simultaneous beams 50 for the cylindrical configuration for the polarimetric phased array antenna 12 consistent with what is recommended by Josefsson and Persson (2006, Chapter 3). It is relatively easy to control sidelobes with the four beams 50 and short distance for polarization antenna element 26 separations. For comparison, a planar polarimetric phased array antenna of three- and four-faces having a beamwidth, at its largest scanning azimuth angle)(60°/45°, to match the WSR-88D is also shown in the table of FIG. 7.

In the case of three beams 50, a 120 degree sector of the cylindrical configuration for the polarimetric phased array antenna 12 is used to form the beam 50. This would require a cylinder of 8.54/sin(60°)=9.88 m diameter and 8.54 m height. This is significantly smaller than the 17.1 m (i.e., 8.54×2) major axis of the elliptical array for a three-face planar polarimetric phased array antenna that matches, at the extremes of electronic steering of 60 degree, the WSR-88D resolution; furthermore there is no need to increase the total power by a factor of 16 (12 dB) to compensate for the loss of detection capability in these directions. For the four simultaneous beams, a 90 degree sector is used to form the beam 50. The cylinder 102 of 12.1 m (~8.54×$\sqrt{2}$) diameter can be used. The diameter of the cylinder 102 is the same as the major axis of the elliptical array of the four-face planar polarimetric phased array antenna, and the total number of polarization antennas 26 for the cylindrical configuration for the polarimetric phased array antenna 12 is the same as for the planar polarimetric phased array antenna. A sector of polarization antennas 26 can have a rectangular shape for four corners. But, the polarization antennas 26 at the corners of the sector of the cylindrical configuration for the polarimetric phased array antenna 12 can be used for sidelobe blanking and pattern synthesis whereas the planar polarimetric phased array antenna would have to have extra elements for such functions. Also the total power of the cylindrical configuration for the polarimetric phased array antenna 12 does not need to be increased by a factor of four (6 dB). Assuming that the spacing between the polarization antennas 26 is the wavelength of 10 cm, there would be 380 array columns and a total of 32680 elements covering the cylinder 102. Commutating one column, the cylindrical configuration for the polarimetric phased array antenna 12 beam moves 0.95°—about the beam width. If the spacing between the polarization antennas 26 is reduced to one half a wavelength (i.e., 5 cm), 760 array columns would be needed to cover the cylinder 102; this significantly increases the number of total polarization antennas 26 to 130720. Nevertheless, this will allow over-sampling at a 0.474° angular spacing, and lower sidelobes. Such fine angular sampling can also be achieved with the one wavelength spacing of the polarization antennas 26, but then the phase of each column would need to be shifted by half the angular increment between the polarization antennas 26.

Shown in FIGS. 8, 9, 10 and 11 are calculated one-way radiation patterns for the aforementioned four beam case of the cylindrical configuration for the polarimetric phased array antenna 12 and their comparisons with theoretical WSR-88D patterns. In particular, FIGS. 8(a) and 8(b) show 3D copolar and cross-polar patterns for an exemplary polarimetric phased array antenna 12 with tapering and polarization compensation. The cross-polar radiation is everywhere at least 45 dB below the copolar peak indicating the polarimetric phased array antenna 12 has high performance for preserving polarization purity. In FIGS. 9, 10, and 11 are the copolar patterns on the two planes through the boresight: the patterns on the horizontal plane are shown in upper panels (a) and (b), and those on vertical plane are in lower panels (c) and (d).

FIG. 9 shows the copolar patterns whereby the dipoles 28a and 28b do not have any equivalent tapering of the WSR-88D illumination, density adjustment, and polarization compensation. Because the WSR-88D pattern is for the tapered illumination, the simulated copular patterns for the polarimetric phased array antenna 12 has higher sidelobes in FIG. 9(a) and (c). This is also true for the near sidelobes as seen in the zoomed-in plots on the right in FIG. 9(b) and (d). The pattern sidelobes for horizontal polarization are a little lower than for vertical polarization because of the natural tapering caused by changes in orientation of the horizontal dipoles as a function of $\phi_n$.

FIG. 10 shows a simulated copolar pattern if Eq. 8, without the cosine term, is applied to the dipoles 28a and 28b within the angular sector forming the beam 50. The sidelobes are substantially reduced except near ±90 degree azimuth angles. This is due to a non-symmetrical density of the polarization antennas 26 that are active and seen from off-broadside directions. Nevertheless, the level is 50 dB below the copolar peak and for two-way patterns that are of interest for meteorological applications, the sidelobe level is 100 dB below the copolar peak. This low sidelobe level is due to the applied tapering. It is also noted that the difference between the two polarizations is now very small because the main contribution to the radiation field comes from polarization antennas 26 within the array near the broadside where there is not much difference in H- and V-polarizations. If density adjustment (i.e., the cosine term in Eq. 8) and polarization compensation are applied, the results become even better (FIG. 8). The mainlobes are almost identical to the WSR-88D reference pattern, which is crucial for high quality polarimetric radar measurements. Although sidelobes still exist, the farther sidelobes are mostly lower than those of WSR-88D's. This is because of the natural tapering in the polarimetric phased array antenna 12 having the cylindrical configuration.

In this patent application, the planar and cylinder array configuration of PPAR for weather measurements have been compared, and a theory for studying the cylindrical configuration of the polarimetric phased array antenna 12 has been proposed. Ideal array polarization antennas 26 have been assumed with given excitation. It is known that a planar polarimetric phased array radar has issues of scan-dependent beam properties including changes in beam and polarization characteristics, polarization coupling, sensitivity loss, and complications in calibration. To compensate for loss of sensitivity loss, the four-faced planar polarimetric phased array radar antenna would have to have a diagonal dimension doubling the size of the WSR-88D and an increase of power by a factor of 4.

The radar data acquisition system 10 having the polarimetric phased array antenna 12, on the other hand, can also make azimuth scan-invariant, high accuracy weather measurements without changing the beam and polarization characteristics while maintaining a manageable antenna size. Compared with the planar polarimetric phased array radar, the preferred embodiment of the polarimetric phased array antenna 12 has the following advantages:

1) Scan-invariant polarimetric radar measurements with the same beam width and polarization characteristics in all azimuth angles for each elevation, allowing easier calibration and data interpretation.
2) Polarization purity—dual-polarized (H and V) wave fields may be orthogonal in all direction, and hence maintains high quality polarimetric data. Compensation may only be needed for horizontal and vertical polarizations separately, but cross-polarization isolation may be maintained.
3) High efficiency of utilizing radiation power. Only certain polarization antennas 26 within the array are activated and properly weighted to achieve the desired beams 50. The polarization antennas 26 on the broadside are mostly activated and weighted higher resulting in less scanning loss due to element radiation pattern.
4) Efficient use of spectrum. For example, the side-by-side and back-to-back beams 50 might use the same frequency because such beams 50 can be a fixed spacing such as 90 (120) degrees apart in the case of four (three) beams.
5) Optimal use of the antenna aperture for fast data update and/or for multi-functionality with more than one simultaneous beam 50.
6) Flexibility to choose the number of beams 50 (e.g., two, three or four) and assign different tasks among beams 50. For example, if four beams 50 are generated, two beams 50 can be used for weather surveillance and the other two beams 50 for aircraft tracking—making the radar data acquisition system 10 having the polarimetric phased array antenna 12 a multi-function phased array radar. This flexibility can be combined with multiple frequencies used in currently proposed planar polarimetric phased array radar, i.e., one band of frequencies for the weather function and another band for aircraft surveillance. The beams 50 can be created differently (size, shape . . . ) for different tasks (e.g. target tracking versus weather observation), and signals can be transmitted and interpreted differently (number of pulse, polarization mode, and signal processing . . . ). Further, different tasks may have different standards that need to be taken into account in signal transmission and processing.
7) No need for face-to-face matching as required for a planar polarimetric phased array radar where each face is an individual radar system having different characteristics that need to be matched with the other face(s).
8) If mounted on a rotatable support system 18, the broadside patterns can be measured and calibrated on site.

References in the specification to "one embodiment", "an embodiment", "an example embodiment", etc. indicate that the embodiments described may include a particular feature, structure or characteristic, but every embodiment may not necessarily include the particular feature, structure or characteristic. Moreover, such phrases are not necessarily referring to the same embodiment. Further, when a particular feature, structure, or characteristic is described in connection with an embodiment, it is submitted that it is within the knowledge of one skilled in the art to effect such future, structure, or characteristic in connection with other embodiments whether or not explicitly described.

Embodiments of the invention with respect to the radar control and processing system 14 may be embodied utilizing machine executable instructions provided or stored on a machine readable medium. A machine-readable medium includes any mechanism which provides, that is, stores and/or transmits, information accessible by communication server, 34, digital signal processor 36, synchronizer 38, RF source 40, data acquisition unit 42, the host computer 44, and/or the user/maintenance workstation 46. Each of the elements forming a part of the radar control and processing system 14 can include a set of one or more processors, etc. that work together. In an exemplary embodiment, a machine-readable medium includes volatile and/or non-volatile media for example read-only memory, random access memory, magnetic disk storage media, optical storage media, flash memory devices or the like.

Such machine executable instructions are utilized to cause a general or special purpose processor, multiple processors, or the like to perform methods or processes of the embodiments of the invention.

It should be understood that the components of the inventions set forth above can be provided as unitary elements, or multiple elements which are connected and/or otherwise adapted to function together, unless specifically limited to a unitary structure in the claims. For example, although the transmitter 30 is depicted as a unitary element, the transmitter 30 could be comprised of multiple discrete elements which are connected together using any suitable technology. As another example, the digital signal processor(s) 36 and the synchronizer(s) 38 may be implemented on a single computer system having one or more local bus and/or processors.

From the above description it is clear that the present invention is well adapted to carry out the disclosed aspects, and to attain the advantages mentioned herein as well as those inherent in the invention. While presently preferred implementations of the invention have been described for purposes of disclosure, it will be understood that numerous changes may be made which readily suggest themselves to those skilled in the art and which are accomplished within the spirit of the invention disclosed.

REFERENCES

The specific parts of the references referred to above are hereby incorporated herein by reference.

Brandes, E., G. Zhang, and J. Vivekanandan, 2003: An evaluation of a drop distribution-based rainfall estimator, *J. Appl. Meteor.*, 42(5), 652-660.

Brookner, E., 2008: Now: Phased-array Radars: Past, Astounding Breakthroughs and Future Trends, *Microwave Journal*, 52(1), 1-30.

Doviak, R. J., D. S. Zrnić, J. Carter, A. Ryzhkov, S. Torres, and A. Zahrai, 1998: Polarimetric Upgrades to Improve Rainfall Measurements. Report of the National Severe Storms Laboratory, Norman, Okla., April, 110 pp.

Doviak, R. J., V. Bringi, A. Ryzhkov, A. Zahrai, and D. Zrnić, 2000: Considerations for polarimetric upgrades to operational WSR-88D radars," *Journal of Atmospheric and Oceanic Technology*, 17, 257-278.

Doviak and Zrnić, 2006: *Doppler Radar and Weather Observations*, $2^{nd}$ Edition, Academic Press, 1993; reprinted by Dover publications 562 pp.

Fulton, C., P. Clough, V. Pai, and W. Chappell, 2009: A digital array radar with a hierarchical system architecture," IEEE MTT-S International Microwave Symposium Digest, June 2009, 89-92.

Heinselman, P. L., D. L. Priegnitz, K. L. Manross, T. M. Smith, and R. W. Adams, 2008: Rapid
sampling of severe storms by the National Weather Radar Testbed Phased Array Radar. Weather and Forecasting, 23, 808-824.

Hopf, A., J. L. Salazar, R. Medina, V. Venkatesh, E. J. Knapp, S. J. Frasier, and D. J. McLaughlin, 2009: Casa phased array radar system description, simulation and products. IEEE International Symposium on Geoscience and Remote Sensing, volume 4.

Ishimaru, A., 1997: *Wave propagation and scattering in random media*. IEEE Press, New York, N.Y., 574 pp.

K. Le, R. Palmer, B. Cheong, T. Yu, G. Zhang, and S. Torres, 2009: On the Use of Auxiliary Receive Channels for Clutter Mitigation on Phased Array Weather Radar, IEEE Transactions on Geoscience and Remote Sensing, 47, 272-284.

Office of Federal Coordinator for Meteorology, Multifunction Phased Array Radar Symposium II, http://www.ofcm.noaa.gov/mpar-symposium/, 17-19 Nov., 2009, Norman, Okla.

Raffaelli, S., and M. Johansson, 2003: Conformal array antenna demonstrator for WCDMA applications, Proceedings of Antenna 03, Kalmar, Sweden, 13-15 May 2003, pp. 207-212.

Royer, G. M., Directive gain and impedance of ring array of antennas, 1966: *IEEE Trans. on Antennas and Propagation,* 52, 1013-1021.

Sherman, S. M., 1988: Monopulse Principles and Techniques, Chapter 5 in *Aspects of Modern Radar*, E. Brookner, editor. Artech House, Boston, pp. 297-335.

Smith, P., J. Davis, E. Im, J. Lazo, D. McLaughlin, R. Palmer, S. Rutledge, S. Sandgathe, R. Serafin, M. Wolfson, and C. Marshall, 2008: *Evaluation of the Multifunction Phased Array Radar Planning Process, National Research Council Report*, August, 2008

Tomasic, B., J. Turtle, and S. Liu, *A Geodesic Sphere Phased Array Antenna for Satellite Control and Communication, International Union of Radio Science, XXVIIth General Assembly*, Maastricht, The Netherlands, August 2002.

Wang, Y., and V. Chandrasekar, Polarization isolation requirements for linear dual-polarization weather radar in simultaneous transmission mode of operation, *IEEE Trans. Geosci. Remote Sensing,* 40(8), 2019-2028, 2006.

Weber, M. E., J. Y. N. Cho, J. S. Herd, J. M. Flavin, W. E. Benner, and G. S. Torok, 2007: The next-generation multimission U.S. surveillance radar network. *Bull. Amer. Meteor. Soc.,* 88, 1739-1751.

Wurman, J., 2003: Preliminary results from the Rapid-DOW, a multi-beam inexpensive alternative to phased arrays, 31*st Conference on Radar Meteorology, Seattle, American Meteorological Society*

Yu, T., M. B. Orescanin, C. D. Curtis, D. S. Zrnic, and D. E. Forsyth, 2007: Beam multiplexing using the phased-array weather radar, *J. Atmos. Ocean. Tech,* 24(4), 616-626.

Zhang, G., J. Vivekanandan, and E. Brandes, 2001: A method for estimating rain rate and drop size distribution form polarimetric radar measurements. *IEEE Trans. on Geoscience and Remote Sensing,* 39(4), 831-841.

Zhang, G., and R. J. Doviak, 2007: Spaced antenna interferometry to measure crossbeam wind, shear, and turbulence: Theory and formulation, *J. Atmos. Ocean. Tech.,* 24(5), 791-805.

Zhang, G., and R. J. Doviak, 2008: Spaced antenna interferometry to detect and locate subvolume inhomogeneities of reflectivity: an analogy with monopulse radar, *J. Atmos. Ocean. Tech.,* 25(11), 1921-1938.

Zhang, G., R. J. Doviak, D. S. Zrnic, J. E. Crain, D. Staiman, and Y. Al-Rashid, 2009a: Phased array radar polarimetry for weather sensing: A theoretical formulation for polarization calibration. *IEEE Trans. on Geoscience and Remote Sensing,* 47(11), 3679-3689.

Zhang, G., R. D. Palmer, D. S. Zrnic, and R. J. Doviak, 2009b: A cylindrical polarimetric phased array radar. U.S. Provisional patent application identified by U.S. Ser. No. 61/261,695.

Zhang, G., Y. Li, R. J. Doviak, D. Priegnitz, J. Carter, and C. Curtis, 2010: Multi-patterns of the National Weather Radar Testbed Mitigate Clutter Received via Sidelobes, *J. Atmos. Ocean. Tech.*, Under review Zrnić, D. S., J. F. Kimpel, D. E. Forsyth, A. Shapiro, G. Crain, R. Ferek, J. Heimmer, W.

Benner, T. J. McNellis, and R. J. Vogt, 2007: Agile-beam phased array radar for weather observations. *Bull. Amer. Meteor. Soc.,* 88(11)1753-1766.

Zrnic, D. S., R. J. Doviak, G. Zhang, and A. Ryzhkov, 2010: Bias in differential reflectivity due to cross coupling through the radiation patterns of polarimetric weather radars, *J. Atmos. Oceanic Tech*. Accepted.

What is claimed is:

1. A polarimetric phased array antenna, comprising:
a support system; and
an array of panels supported by the support system, the array of panels comprising a plurality of antennas, wherein each antenna comprises a horizontally (H) polarized array element and a vertically (V) polarized array element arranged to form two orthogonally polarized horizontal and vertical radiating fields which together form a dual H and V polarized electromagnetic beam, wherein the array of panels is arranged in multiple rows so as to form a substantially cylindrical configuration on the support system.

2. The polarimetric phased array antenna of claim 1, wherein the panels of the array of panels are planar and the array includes horizontally adjacent panels and vertically adjacent panels, and also wherein the horizontally adjacent panels are positioned at a non-zero angle and the vertically adjacent panels are in a same plane to form the substantially cylindrical configuration.

3. A radar data acquisition system, comprising:
a polarimetric phased array antenna, comprising:
a support system;
an array of panels supported by the support system, the array of panels comprising a plurality of antennas, wherein each antenna comprises a horizontally (H) polarized array element and a vertically (V) polarized array element arranged to form two orthogonally polarized horizontal and vertical radiating fields which together form a dual H and V polarized electromagnetic beam, wherein the array of panels is arranged in multiple rows so as to form a substantially cylindrical configuration on the support system; and
a radar control and processing system configured to form and direct electromagnetic signals based on a phase shift term and a weighting matrix to one or more selected panels such that the one or more selected panels form the dual H and V polarized electromagnetic beam, and adapted to read and decode signals sensed by one or more selected panels into an electronic radar output and wherein the dual H and V polarized electromagnetic beam (1) has the same beam width in all azimuth directions and (2) maintains cross-polarization isolation via orthogonal dual-polarizations in all beam pointing directions.

4. The radar data acquisition system of claim 3, wherein the electronic radar output is indicative of weather information.

5. The radar data acquisition system of claim 3, further comprising a switching network which communicates with the one or more selected panels such that at least one of power, radar and control signals are sent to and received from the one or more selected panels, and wherein the radar control and processing system is configured to communicate with the switching network for forming electromagnetic signals for a first task and a second task in which the first task is different from the second task, and decoding the signals into the electronic radar output indicative of the first task and the second task.

6. A polarimetric phased array antenna, comprising:
an array of panels, the array of panels comprising a plurality of antennas, wherein each antenna comprises a horizontally (H) polarized array element and a vertically (V) polarized array element arranged to form two orthogonally polarized horizontal and vertical radiating fields which together form a dual H and V polarized electromagnetic beam;
a support system for supporting the array of panels in multiple rows such that the panels form a substantially cylindrical configuration; and
a switching network for communicating with one or more of the panels such that at least one of power, radar and control signals are sent to and received from the one or more panels.

7. The polarimetric phased array antenna of claim 6, wherein the panels of the array of panels are planar and the array includes horizontally adjacent panels and vertically adjacent panels, and also where the horizontally adjacently disposed panels are positioned at a non-zero angle and the vertically adjacent panels are in a same plane to form the substantially cylindrical configuration.

8. A radar data acquisition system, comprising:
a polarimetric phased array antenna, comprising:
an array of panels, the array of panels comprising a plurality of antennas, wherein each antenna comprises a horizontally (H) polarized array element and a vertically (V) polarized array element arranged to form two orthogonally polarized horizontal and vertical radiating fields which together form a dual H and V polarized electromagnetic beam, wherein the array of panels is arranged in a substantially cylindrical configuration on the support system;
a support system supporting the array of panels in a substantially cylindrical configuration;
a switching network communicating with one or more selected panels of the array of panels such that at least one of power, radar and control signals are sent to and received from the one or more selected panels; and
a radar control and processing system configured to form and direct electromagnetic signals based on a phase shift term and a weighting matrix to a switching network for forming electromagnetic signals directed to the one or more selected panels such that the one or more selected panels form the dual H and V polarized electromagnetic beam (1) having the same beam width in all azimuth directions and (2) maintaining cross-polarization isolation via orthogonal dual-polarizations in all beam pointing directions, and configured to read and decode signals sensed by one or more selected panels into an electronic radar output.

9. The radar data acquisition system of claim 8, wherein the electronic radar output is indicative of weather information.

10. The radar data acquisition system of claim 8, wherein the switching network is defined further such that at least one of power, radar and control signals are sent to and received from the one or more selected panels, and wherein the radar control and processing system is configured to communicate with the switching network for forming electromagnetic signals for a first task and a second task in which the first task is different from the second task, and decoding the signals into the electronic radar output indicative of the first task and the second task.

11. The radar data acquisition system of claim 8, wherein the panels of the array of panels are planar and the array includes horizontally adjacent panels and vertically adjacent panels, and wherein the horizontally adjacently disposed panels are positioned at a non-zero angle and the vertically adjacent panels are in a same plane to form the substantially cylindrical configuration.

12. The radar data acquisition system of claim 9, wherein the weather information includes precipitation information.

13. The radar data acquisition system of claim 12, wherein the precipitation information includes information about one or more of: rain, snow, and drizzle.

14. The polarimetric phased array antenna of claim 1, further comprising a switching network which communicates with one or more selected panels of the array of panels such that the at least one of power, radar and control signals are sent to and received from the one or more selected panels, and wherein the polarimetric phased array antenna further comprises a radar control and processing system configured to communicate with the switching network for forming electromagnetic signals for a first task and a second task in which the first task is different from the second task, and decoding the signals into the electronic radar output indicative of the first task and the second task.

15. The polarimetric phased array antenna of claim 14, wherein the electronic radar output is indicative of weather information.

16. The polarimetric phased array antenna of claim 15, wherein the weather information includes precipitation information.

17. The polarimetric phased array antenna of claim 16, wherein the precipitation information includes information about one or more of: rain, snow, and drizzle.

18. A polarimetric phased array antenna, comprising:
a support system; and
an array of panels supported by the support system, the array of panels comprising a plurality of antennas, wherein each antenna comprises a horizontally (H) polarized array element and a vertically (V) polarized array element arranged to form two orthogonally polarized horizontal and vertical radiating fields which together form a dual H and V polarized electromagnetic beam, wherein the array of panels is arranged in multiple rows so as to form a substantially cylindrical configuration on the support system, and wherein at least one panel of the array of panels is configured to receive electromagnetic signals based on a phase shift term and a weighting matrix to form the dual H and V polarized electromagnetic beam, such that when the dual H and V polarized electromagnetic beam is transmitted from the at least one panel, the dual polarization electromagnetic beam has the same beam width in an azimuth direction and maintains cross-polarization isolation via orthogonal dual-polarizations when being scanned.

19. The polarimetric phased array antenna of claim 1, wherein the horizontally polarized array element and the vertically polarized array element comprise a pair of dipoles in a cross pattern.

20. The polarimetric phased array antenna of claim 1, wherein the horizontally polarized array element and the vertically polarized array element are arranged in an interlaced fashion.

* * * * *

UNITED STATES PATENT AND TRADEMARK OFFICE
CERTIFICATE OF CORRECTION

PATENT NO. : 8,988,274 B2
APPLICATION NO. : 12/947523
DATED : March 24, 2015
INVENTOR(S) : Guifu Zhang et al.

Page 1 of 1

It is certified that error appears in the above-identified patent and that said Letters Patent is hereby corrected as shown below:

In The Specification:
Column 2, line 21: Delete "govimpar" and replace with -- gov/mpar --

Column 5, line 25: Delete " $\vec{r}$ " and replace with -- $\vec{r}_{mn}$ --

Column 7, line 25: After "surface 100 at" Delete " $\vec{r}_{mn}\; \vec{r}_{mn}$ " and replace with -- $\vec{r}_{mn}$ --

In The Claims:
Column 17, lines 38-39: Delete "adjacently disposed" and replace with -- adjacent --

Column 18, line 19: Delete "adjacently disposed" and replace with -- adjacent --

Signed and Sealed this
Twenty-first Day of July, 2015

Michelle K. Lee
*Director of the United States Patent and Trademark Office*